(12) United States Patent
McGuire et al.

(10) Patent No.: US 8,113,321 B2
(45) Date of Patent: Feb. 14, 2012

(54) HELICOPTER REDUCED VIBRATION ISOLATOR AXIAL SUPPORT STRUT

(75) Inventors: Dennis McGuire, Erie, PA (US); Lane R. Miller, Fuquay-Varina, NC (US); Mark R. Jolly, Raleigh, NC (US); Askari Badre-Alam, Apex, NC (US)

(73) Assignee: Lord Corporation, Cary, NC (US)

( * ) Notice: Subject to any disclaimer, the term of this patent is extended or adjusted under 35 U.S.C. 154(b) by 1127 days.

(21) Appl. No.: 11/745,270

(22) Filed: May 7, 2007

(65) Prior Publication Data

US 2008/0142633 A1 Jun. 19, 2008

Related U.S. Application Data

(60) Provisional application No. 60/797,856, filed on May 6, 2006.

(51) Int. Cl.
*F16F 9/34* (2006.01)

(52) U.S. Cl. .................. 188/266.3; 267/34; 280/5.514; 188/266.5; 244/17.27

(58) Field of Classification Search .............. 188/266.5, 188/267.1, 267.2, 378, 266.3; 244/17.27, 244/54, 60, 104 FP; 280/5.514; 267/34
See application file for complete search history.

(56) References Cited

U.S. PATENT DOCUMENTS

| 3,202,388 | A | 8/1965 | Goodwin |
| 3,322,379 | A | 5/1967 | Flannelly |
| 3,477,665 | A | 11/1969 | Legrand |
| 3,698,663 | A | 10/1972 | Blake et al. |
| 3,845,917 | A | 11/1974 | Drees |
| 3,858,831 | A | 1/1975 | Halwes |
| 4,236,607 | A | 12/1980 | Halwes |
| 4,350,232 | A | 9/1982 | Yang |
| 4,536,114 | A | 8/1985 | Belew |
| 4,819,182 | A | 4/1989 | King et al. |
| 4,838,392 | A | 6/1989 | Miller et al. |
| 4,974,794 | A | 12/1990 | Aubry et al. |
| 5,029,677 | A | 7/1991 | Mitsui |
| 5,060,959 | A | * | 10/1991 | Davis et al. ................. 280/5.514 |
| 5,070,284 | A | * | 12/1991 | Patil et al. ..................... 318/362 |
| 5,127,607 | A | 7/1992 | McGuire |
| 5,170,103 | A | 12/1992 | Rouch et al. |
| 5,178,241 | A | * | 1/1993 | Aubry ............................ 188/317 |

(Continued)

FOREIGN PATENT DOCUMENTS

EP 1724191 A1 11/2006

(Continued)

OTHER PUBLICATIONS

McGuire, "Fluidlastic® Dampers and Isolators for Vibration Control in Helicopters", American Helicopter Society 50th Annual Forum, Washington, DC, May 1994.

(Continued)

*Primary Examiner* — Christopher Schwartz
(74) *Attorney, Agent, or Firm* — Richard G. Miller

(57) ABSTRACT

Helicopter reduced vibration axial support struts and aircraft suspension system are disclosed with at least one vibration controlling fluid containing strut. The powered struts include an outer rigid housing containing an inner rigid member and first and second variable volume fluid chambers. Fluid pressure differentials are created between the first and second variable volume fluid chambers to control motion between the strut ends. The powered fluid containing struts, support isolators, suspension systems, and methods of operation provide reduced helicopter aircraft vibrations.

25 Claims, 26 Drawing Sheets

U.S. PATENT DOCUMENTS

| | | | |
|---|---|---|---|
| 5,219,143 A | 6/1993 | Staple et al. | |
| 5,228,640 A | 7/1993 | Mouille | |
| 5,269,489 A | 12/1993 | West et al. | |
| 5,310,140 A * | 5/1994 | Veaux et al. | 244/104 FP |
| 5,316,240 A | 5/1994 | Girard et al. | |
| 5,332,072 A | 7/1994 | Crannage | |
| 5,374,039 A | 12/1994 | Schmidt et al. | |
| 5,383,133 A | 1/1995 | Staple | |
| 5,435,531 A | 7/1995 | Smith et al. | |
| 5,439,082 A | 8/1995 | McKeown et al. | |
| 5,458,222 A | 10/1995 | Pla et al. | |
| 5,501,434 A | 3/1996 | McGuire | |
| 5,540,549 A | 7/1996 | McGuire | |
| 5,620,068 A | 4/1997 | Garnjost et al. | |
| 5,666,806 A | 9/1997 | Dietz | |
| 5,732,905 A | 3/1998 | Krysinski | |
| 5,762,295 A | 6/1998 | McGuire et al. | |
| 5,775,469 A | 7/1998 | Kang | |
| 5,788,372 A | 8/1998 | Jones et al. | |
| 5,813,226 A | 9/1998 | Krone et al. | |
| 5,823,307 A | 10/1998 | Schubert et al. | |
| 5,853,144 A | 12/1998 | Vincent | |
| 5,906,254 A | 5/1999 | Schmidt et al. | |
| 5,947,457 A | 9/1999 | Swanson et al. | |
| 6,003,849 A * | 12/1999 | Davis et al. | 267/140.14 |
| 6,009,983 A | 1/2000 | Stamps et al. | |
| 6,032,770 A | 3/2000 | Alcone et al. | |
| 6,068,249 A | 5/2000 | Shtarkman | |
| 6,092,795 A | 7/2000 | McGuire | |
| 6,138,458 A | 10/2000 | Griffin | |
| 6,229,898 B1 | 5/2001 | Goodman | |
| 6,293,532 B2 | 9/2001 | McGuire | |
| 6,325,327 B1 | 12/2001 | Zoppitelli et al. | |
| 6,328,323 B1 | 12/2001 | Elser | |
| 6,378,851 B1 | 4/2002 | McGuire | |
| 6,416,016 B1 | 7/2002 | Welsh | |
| 6,460,803 B1 | 10/2002 | Kiss et al. | |
| 6,467,723 B1 | 10/2002 | Rossetti et al. | |
| 6,480,609 B1 | 11/2002 | Strehlow et al. | |
| 6,604,451 B1 | 8/2003 | Yasuda | |
| 6,644,590 B2 | 11/2003 | Terpay et al. | |
| 6,695,106 B2 | 2/2004 | Smith et al. | |
| 6,758,466 B2 | 7/2004 | Russell | |
| 6,772,074 B2 | 8/2004 | Millott et al. | |
| 6,926,500 B2 | 8/2005 | Ferullo | |
| 7,005,816 B2 * | 2/2006 | Hio et al. | 318/375 |
| 7,137,624 B2 | 11/2006 | Russell et al. | |
| 7,270,321 B2 | 9/2007 | Russell | |
| 2002/0063186 A1 | 5/2002 | Welsh | |
| 2003/0057318 A1 | 3/2003 | Struzik et al. | |
| 2004/0099783 A1 | 5/2004 | Kienholz | |
| 2004/0099784 A1 | 5/2004 | Kienholz | |
| 2006/0096815 A1 * | 5/2006 | Kondo et al. | 188/266.5 |

FOREIGN PATENT DOCUMENTS

| | | |
|---|---|---|
| EP | 2182241 A2 | 5/2010 |
| JP | 06-1044376 | 5/2004 |
| WO | 02/27210 A1 | 4/2002 |
| WO | 2004/111489 A3 | 12/2004 |
| WO | 2007/062421 A1 | 5/2007 |

OTHER PUBLICATIONS

Narayana et al., "Design, Development, and Validation of an Anti-Resonant Isolation System for Advanced Light Helicopter", 24th European Rotorcraft Forum, Marseille, France, Sep. 1998.

Smith et al., "The Model 427 Pylon Isolation System", American Helicopter Society 55th Annual Forum, Montreal, Quebec, Canada, May 1999.

McGuire, "High Stiffness 'Rigid' Helicopter Pylon Vibration Isolation Systems", American Helicopter Society 59th Annual Forum, Phoenix, AZ May 2003.

Heilmann et al., "Vibration Attenuation Through the Use of Active Frahms" American Helicopter Society 59th Annual Forum, Phoenix, AZ May 2003.

Miller et al., "Modeling and Performance of an Experimental Active Vibration Isolator", American Society of Mechanical Engineers DSC, vol. 38, 1992.

Panza et al., "Modeling, Actuation and Control of an Active Fluid Vibration Isolator", Transactions of the American Society of Mechanical Engineers, vol. 119, Jan. 1997.

Smith et al., "Dynamically Tailored Airframe Structures Program", American Helicopter Society 57th Annual Forum, Washington, D.C., May 2001.

Smith et al., "Results from the Dynamically Tailored Airframe Structures Program" American Helicopter Society 58th Annual Forum, Montreal, Canada, Jun. 2002.

McGuire, "Active Vibration Control Using Fluidlastic® Pylon Struts", American Helicopter Society 62nd Annual Forum, Phoenix, AZ, Sep. 11, 2006.

* cited by examiner

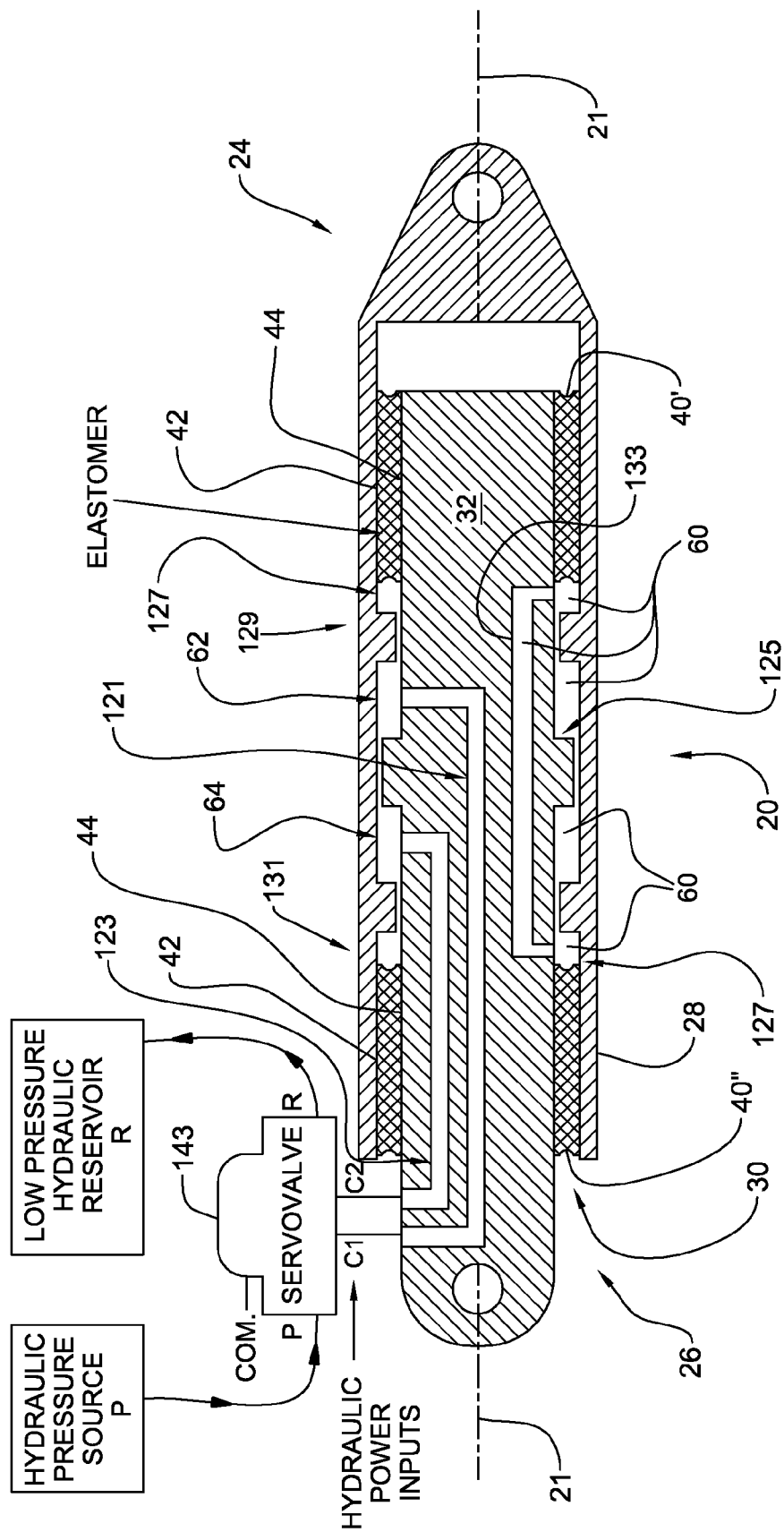

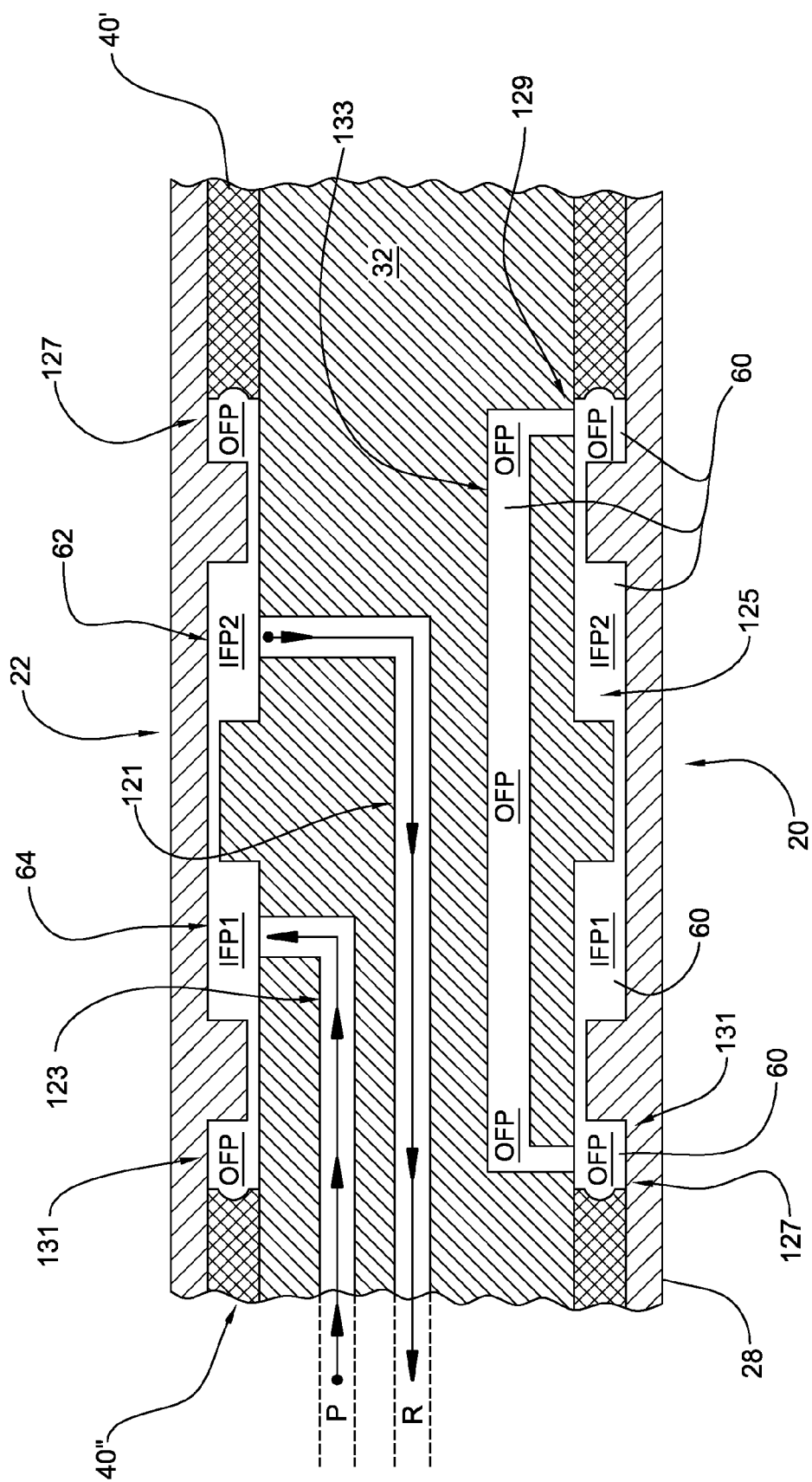

US 8,113,321 B2

HELICOPTER REDUCED VIBRATION ISOLATOR AXIAL SUPPORT STRUT

CROSS REFERENCE

This application claims the benefit of, and incorporates by reference, U.S. Provisional Patent Application No. 60/797,856 filed on May 6, 2006 as HELICOPTER REDUCED VIBRATION ISOLATOR AXIAL SUPPORT STRUT with the U.S. Patent and Trademark Office.

FIELD OF THE INVENTION

The invention relates to the field of support struts for supporting an axial load and controlling troublesome vibrations. The invention relates to the field of isolated support struts for controlling vibrations and supporting loads. More particularly the invention relates to the field of supporting loads and isolating vibrations in aircrafts, and more particularly provides rotary wing aircraft suspension systems with beneficial motion control and load carrying capacity.

BACKGROUND OF THE INVENTION

There is a need for struts for supporting a load while providing motion control and vibration isolation. There is a need for helicopter support struts for isolating vibrations while supporting axial loads. There is a need for support struts and isolators which accurately and economically control and minimize vibrations. There is a need for an economically feasible method of making isolated suspension struts and aircraft suspension systems. There is a need for a robust suspension system and support isolators for isolating troublesome vibrations and carrying axial loads. There is a need for an economic aircraft suspension system providing beneficial controlled motion and vibration isolation.

SUMMARY OF THE INVENTION

In an embodiment the invention includes a support strut for supporting an axial load, the support strut including a strut isolator. The strut isolator has a first strut end member and a second strut end member, the second strut end distal from the first strut end. The first strut end member includes an outer rigid housing, the outer rigid housing defining an inner cavity. The second strut end member includes an inner rigid member, the inner rigid member extending into the outer rigid housing inner cavity, the inner rigid member including an inertial track extending in a direction from the first strut end towards the second strut end, the inertial track having a first entrance end proximate the first strut end and a second entrance end proximate the second strut end. The inner rigid member including an internal housing cavity. The isolator includes a first outer tubular elastomer disposed between the outer rigid housing and the inner rigid member, the first outer tubular elastomer bonded to a first inner rigid surface of the outer rigid housing, the first outer tubular elastomer bonded to a first outer rigid surface of the inner rigid member. The isolator includes an isolator fluid. The outer rigid housing houses a first variable volume fluid chamber proximate the first strut end and the first track entrance end. The inner rigid member internal housing cavity houses a second variable volume fluid chamber proximate the second strut end and the second track entrance end. The isolator includes an actuator plunger, the actuator plunger proximate the second variable volume fluid chamber. A movement of the first strut end member in a first strut direction plungers the fluid from the first variable volume chamber through the track towards the second variable volume chamber, and an opposite movement of the first strut end member in a second direction plungers the fluid from the second variable volume chamber through the track towards the first variable volume chamber, and an actuator plunger contracting stroke in a first actuator direction contracts the second variable volume chamber, and an actuator plunger expanding stroke in an opposite second actuator direction expands the second variable volume chamber to inhibit a transmission of a vibration.

In an embodiment the invention includes a support strut isolator, the isolator having a first strut end member and a second strut end member. The first strut end member including an outer rigid housing, the outer rigid housing defining an inner cavity. The second strut end member including an inner rigid member, the inner rigid member extending into the outer rigid housing inner cavity, the inner rigid member including an inertial track extending in a direction from the first strut end towards the second strut end. The inertial track having a first entrance end proximate the first strut end and a second entrance end proximate the second strut end. The inner rigid member including an internal housing cavity, first outer tubular elastomer disposed between the outer rigid housing and the inner rigid member, the first outer tubular elastomer bonded to a first inner rigid surface of the outer rigid housing. The first outer tubular elastomer bonded to a first outer rigid surface of the inner rigid member. The first outer tubular elastomer having an inside diameter $ID1$. The isolator including an isolator fluid. The isolator including a first variable volume fluid chamber proximate the first strut end and the first track entrance end. The inner rigid member internal housing cavity housing a second variable volume fluid chamber proximate the second strut end and the second track entrance end, the second variable volume fluid chamber including a bonded second inner tubular elastomer, the bonded second inner tubular elastomer having an inside diameter $ID2$, the bonded second inner tubular elastomer inside diameter $ID2$ less than $ID1$. A movement of the first strut end member in a first strut direction plungers the fluid from the first variable volume chamber through the track towards the second variable volume chamber, and an opposite movement plungers the fluid from the second variable volume chamber through the track towards the first variable volume chamber, and an actuator plunger contracting stroke in a first actuator direction contracts the second variable volume chamber, and an actuator plunger expanding stroke in an opposite second actuator direction expands the second variable volume chamber.

In an embodiment the invention includes a longitudinal isolator. The longitudinal isolator having an exterior and a longitudinally extending axis, the isolator having a first end member and a second end member, the second end opposite from the first end along the longitudinally extending axis. The first end member including an outer rigid housing, the outer rigid housing defining an inner cavity. The second end member including an inner rigid member, the inner rigid member extending into the outer rigid housing inner cavity, the inner rigid member including an inertial track extending in a direction from the first strut end towards the second strut end, the inertial track having a first entrance end proximate the first strut end and a second entrance end proximate the second strut end, the inner rigid member including an internal housing cavity. The longitudinal isolator having a first outer tubular elastomer bonded between the outer rigid housing and the inner rigid member. The first outer tubular bonded elastomer having an inside diameter $ID1$ and an outside diameter $OD1$. The longitudinal isolator containing an isolator fluid. The longitudinal isolator containing a first variable volume fluid chamber proximate the first strut end and the first track entrance end, the inner rigid member internal housing cavity housing a second variable volume fluid chamber proximate the second strut end and the second track entrance end, the second variable volume fluid chamber including an externally powered actuator plunger and a bonded second inner tubular elastomer, the bonded second inner tubular elastomer having an inside diameter ID2 and an outside diameter OD2, the bonded second inner tubular elastomer inside diameter ID2 bonded to an outer plunger surface of the powered actuator plunger and the bonded second inner tubular elastomer outside diameter OD2 bonded to an inner rigid member internal housing cavity inside bonding wall, the bonded second inner tubular elastomer inside diameter ID2<ID1. The actuator plunger contracting stroke in a first actuator direction contracts the second variable volume chamber, and an actuator plunger expanding stroke in an opposite second actuator direction expands the second variable volume chamber, and a movement of the first strut end member in a first strut direction towards the second strut end member plungers the fluid from the first variable volume chamber through the track towards the second variable volume chamber, and an opposite movement of the first strut end member in a second direction away from the second strut end plungers the fluid from the second variable volume chamber through the track towards the first variable volume chamber.

In an embodiment the invention includes a support strut isolator, the support strut isolator having an exterior and a longitudinally extending axis, the support strut isolator having a first end and a second end, the second end opposite from the first end along the longitudinally extending axis. The first end including an outer rigid longitudinally extending housing, the outer rigid longitudinally extending housing extending longitudinally towards the second end, the outer rigid longitudinally extending housing defining an inner cavity. The inner cavity containing a first variable volume chamber and a second variable volume chamber with an isolator fluid. The second strut end including a rigid structural extension longitudinally extending from the isolator exterior into the inner cavity, the rigid structural extension including an inner rigid member, the inner rigid member including an inertial fluid track extending in a direction from the first end towards the second end, the inertial fluid track having a first entrance end in fluid communication with the first variable volume chamber and a second entrance end in fluid communication with the second variable volume chamber. The isolator includes a spring between the inner rigid member and the outer rigid housing providing a high static spring stiffness of at least 3,000 lbs/inch. The isolator including an actuator plunger wherein a vibration movement of the first strut end member in a first strut direction towards the second strut end member plungers the fluid from the first variable volume chamber through the track towards the second variable volume chamber, and an opposite vibration movement of the first strut end member in a second direction away from the second strut end plungers the fluid from the second variable volume chamber through the track towards the first variable volume chamber. An applied actuator power applied to the actuator plunger provides an actuator plunger contracting stroke in a first actuator direction which contracts the second variable volume chamber and an actuator plunger expanding stroke in an opposite second actuator direction which expands the second variable volume chamber.

In an embodiment the invention includes an aircraft suspension system for isolating an aircraft power unit having at least one aircraft power unit operation frequency. The aircraft suspension system comprised of at least one isolated suspension support strut, wherein the isolated suspension support strut includes an outer rigid isolator housing, the outer rigid isolator housing houses a first outer tubular elastomer, a first variable volume fluid chamber, a second variable volume fluid chamber, a tuned isolator fluid inertial track between the first variable volume fluid chamber and the second variable volume fluid chamber, the tuned isolator fluid inertial track providing for a flow of an isolator fluid between the first variable volume fluid chamber and the second variable volume fluid chamber, the tuned isolator fluid inertial track having a tuned frequency isolation notch band, the frequency notch band centered about a center frequency, and having a notch band width, with the notch band width encompassing the power unit operation frequency, and the isolated suspension support strut outer rigid isolator housing including a plungering actuator, the plungering actuator powered to increase the flow of isolator fluid.

In an embodiment the invention includes a rotary aircraft motive power unit suspension system for isolating a rotary aircraft motive power unit having at least one aircraft motive power unit operation frequency (rotor blade N per Rev). The rotary aircraft motive power unit suspension system comprised of at least one longitudinal isolated powered suspension strut, wherein the longitudinal isolated powered suspension strut includes a powered strut isolator having a tuned isolator fluid inertial track path with a tuned frequency isolation notch band, the tuned frequency isolation notch band centered about a center notch frequency, the tuned frequency isolation notch band having a notch band width and an unpowered center notch magnitude, with the notch band width encompassing the at least one aircraft motive power unit operation frequency, the powered strut isolator including a powered actuator plunger for contracting and expanding a variable volume fluid chamber, the powered actuator driven at a powered frequency wherein the tuned frequency isolation notch band center notch magnitude is increased.

In an embodiment the invention includes a method of upgrading a helicopter. The method including providing a helicopter having a first support strut member for supporting an axial load between a first strut helicopter attachment and a second strut helicopter attachment. The method includes detaching the first support strut member from the first strut helicopter attachment and the second strut helicopter attachment. The method includes providing an upgrade support strut for supporting the axial load, the upgrade support strut including a strut isolator, the strut isolator having a first strut end member and a second strut end member, the second strut end distal from the first strut end, the first strut end member including an outer rigid housing, the outer rigid housing defining an inner cavity, the second strut end member including an inner rigid member, the inner rigid member extending into the outer rigid housing inner cavity, the inner rigid member including an inertial track extending in a direction from the first strut end towards the second strut end, the inertial track having a first entrance end proximate the first strut end and a second entrance end proximate the second strut end, the inner rigid member including an internal housing cavity, a first outer tubular elastomer disposed between the outer rigid housing and the inner rigid member, the first outer tubular elastomer bonded to a first inner rigid surface of the outer rigid housing, the first outer tubular elastomer bonded to a first outer rigid surface of the inner rigid member, an isolator fluid, the outer rigid housing, and the inner rigid member providing a first variable volume fluid chamber proximate the first strut end and the first track entrance end, the inner rigid member internal housing cavity housing a second variable volume fluid chamber proximate the second strut end and the second track entrance end, an actuator plunger, the actuator plunger disposed proximate the second variable volume fluid chamber. The method includes connecting an actuator power input to the actuator plunger. The method includes attaching the upgrade support strut to the first strut helicopter attachment and the second strut helicopter attachment wherein a movement of the first strut end member in a first strut direction towards the second strut end member plungers the fluid from the first variable volume chamber through the track towards the second variable volume chamber, and an opposite movement of the first strut end member in a second direction away from the second strut end plungers the fluid from the second variable volume chamber through the track towards the first variable volume chamber, an actuator plunger contracting stroke powered by the actuator power input in a first actuator direction contracts the second variable volume chamber, and an actuator plunger expanding stroke in an opposite second actuator direction expands the second variable volume chamber.

In an embodiment the invention includes a method of making a vibration reduced aircraft. The method includes providing an aircraft structure having an axial linkage load path between a first body attachment and a second body attachment, the axial linkage load path carrying an axial load between the first body attachment and the second body attachment and conducting a troublesome vibration between the first body attachment and the second body attachment. The method includes providing a support strut for supporting the axial load, the support strut including a strut isolator, the strut isolator having a first strut end member and a second strut end member, the second strut end distal from the first strut end, the first strut end member including an outer rigid housing, the outer rigid housing defining an inner cavity, the second strut end member including an inner rigid member, the inner rigid member extending into the outer rigid housing inner cavity, the inner rigid member including an inertial track extending in a direction from the first strut end towards the second strut end, the inertial track having a first entrance end proximate the first strut end and a second entrance end proximate the second strut end, the inner rigid member including an internal housing cavity, a first outer tubular elastomer disposed between the outer rigid housing and the inner rigid member, the first outer tubular elastomer bonded to a first inner rigid surface of the outer rigid housing, the first outer tubular elastomer bonded to a first outer rigid surface of the inner rigid member, an isolator fluid, the outer rigid housing, and the inner rigid member providing a first variable volume fluid chamber proximate the first strut end and the first track entrance end, the inner rigid member internal housing cavity housing a second variable volume fluid chamber proximate the second strut end and the second track entrance end, an actuator plunger, the actuator plunger disposed in the inner rigid member proximate the second variable volume fluid chamber. The method includes attaching the support strut to the first body attachment and the second body attachment. The method includes supplying an actuator power input to the actuator plunger, wherein a movement of the first strut end member in a first strut direction towards the second strut end member plungers the fluid from the first variable volume chamber through the track towards the second variable volume chamber, and an opposite movement of the first strut end member in a second direction away from the second strut end member plungers the fluid from the second variable volume chamber through the track towards the first variable volume chamber, and an actuator plunger contracting stroke powered by the actuator power input contracts the second variable volume chamber, and an actuator plunger expanding stroke in an opposite second actuator direction expands the second variable volume chamber, with the actuator power supplied to the actuator plunger to inhibit a transmission of the troublesome vibration between the first body attachment and the second body attachment.

In an embodiment the invention includes a method of upgrading a helicopter. The method includes providing a helicopter having a first support strut member for supporting an axial load between a first strut helicopter attachment and a second strut helicopter attachment, and detaching the first support strut member from the first strut helicopter attachment and the second strut helicopter attachment. The method includes providing an upgrade support strut for supporting the axial load, the upgrade support strut including a strut isolator, the strut isolator having a first strut end member and a second strut end member, the second strut end distal from the first strut end, the first strut end member including an outer rigid housing, the outer rigid housing defining an inner cavity, the second strut end member including an inner rigid member, the inner rigid member extending into the outer rigid housing inner cavity, a first outer tubular elastomer disposed between the outer rigid housing and the inner rigid member, the first outer tubular elastomer bonded to a first inner rigid surface of the outer rigid housing, the first outer tubular elastomer bonded to a first outer rigid surface of the inner rigid member, a fluid, the outer rigid housing and the inner rigid member providing a first variable volume fluid chamber proximate the first strut end and a second variable volume fluid chamber proximate the second strut end. The method includes connecting a power input to the upgrade support strut, attaching the upgrade support strut to the first strut helicopter attachment and the second strut helicopter attachment, and inputting power into the strut isolator to control a vibration.

In an embodiment the invention includes a hydraulic control system. The hydraulic control system comprised of at least one hydraulic member with an outer rigid housing and an inner rigid member extending into the outer rigid housing, at least a first outer bonded elastomer bonded between the inner rigid member and the outer rigid housing, the outer rigid housing and the inner rigid member providing a first variable volume fluid internal chamber and a second variable volume fluid internal chamber with an inner rigid member hydraulic fluid moved plunger piston between the first variable volume fluid internal chamber and the second variable volume fluid internal chamber, the hydraulic control system including a first chamber hydraulic fluid delivery conduit for delivering hydraulic fluid to the first variable volume fluid internal chamber and a second chamber hydraulic fluid delivery conduit for delivering hydraulic fluid to the second variable volume fluid internal chamber.

In an embodiment the invention includes a method of controlling a hydraulic system. The method includes providing a hydraulic power supply, the hydraulic power supply providing a source of hydraulic fluid. The method includes providing at least one hydraulic member, the hydraulic member having an outer rigid housing and an inner rigid member extending into the outer rigid housing, at least a first outer bonded elastomer bonded between the inner rigid member and the outer rigid housing, the outer rigid housing and the inner rigid member providing a first variable volume fluid internal chamber and a second variable volume fluid internal chamber with an inner rigid member hydraulic fluid moved piston between the first variable volume fluid internal chamber and the second variable volume fluid internal chamber, the hydraulic member including a first chamber hydraulic fluid delivery conduit for delivering hydraulic fluid to the first variable volume fluid internal chamber and a second chamber hydraulic fluid delivery conduit for delivering hydraulic fluid to the second variable volume fluid internal chamber. The method includes connecting the hydraulic power supply to the first chamber hydraulic fluid delivery conduit and the second chamber hydraulic fluid delivery conduit. The method includes supplying hydraulic fluid to the first variable volume fluid internal chamber and the second variable volume fluid internal chamber to produce controlled dynamic forces.

In an embodiment the invention includes a device for controlling motion. The device includes a fluid containing member with a fluid and an outer rigid tubular housing and an inner rigid member extending into the outer rigid housing, at least a first outer bonded tubular elastomer bonded between the inner rigid member and the outer rigid housing, the outer rigid housing and the inner rigid member providing a first variable volume fluid internal chamber and a second variable volume fluid internal chamber with an inner rigid member nonelastomer intermediate between the first variable volume fluid internal chamber and the second variable volume fluid internal chamber, and a powered means for creating a fluid pressure differential between the first variable volume fluid internal chamber and the second variable volume fluid internal chamber.

In an embodiment the invention includes a method of controlling motion. The method includes providing a fluid containing member with a fluid and an outer rigid tubular housing and an inner rigid member extending into the outer rigid housing, at least a first outer bonded tubular elastomer bonded between the inner rigid member and the outer rigid housing, the outer rigid housing and the inner rigid member providing a first variable volume fluid internal chamber and a second variable volume fluid internal chamber with an inner rigid member nonelastomer intermediate between the first variable volume fluid internal chamber and the second variable volume fluid internal chamber. The method includes creating a fluid pressure differential between the first variable volume fluid internal chamber and the second variable volume fluid internal chamber.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 8A-8C illustrate embodiments of fluid containing struts, including methods and systems for operation of hydraulic powered fluid containing struts.

DETAILED DESCRIPTION OF THE PREFERRED EMBODIMENT

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a support strut isolator. The isolator having a first strut end member and a second strut end member, the second strut end distal from the first strut end. The first strut end member including an outer rigid housing, the outer rigid housing defining an inner cavity. The second strut end member including an inner rigid member, the inner rigid member extending into the outer rigid housing inner cavity, the inner rigid member including an inertial track extending in a direction from the first strut end towards the second strut end, the inertial track having a first entrance end proximate the first strut end and a second entrance end proximate the second strut end, the inner rigid member including an internal housing cavity. The first outer tubular elastomer disposed between the outer rigid housing and the inner rigid member. The first outer tubular elastomer bonded to a first inner rigid surface and a first outer rigid surface and having an inside diameter ID1. The isolator containing an isolator fluid, a first variable volume fluid chamber proximate the first strut end and the first track entrance end, a second variable volume fluid chamber proximate the second strut end and the second track entrance end. The isolator includes a variable volume fluid compensator, said variable volume compensator comprised of an at least double sprung compensator piston, preferably with a first mechanical spring and a second gas spring.

Figure 1A:
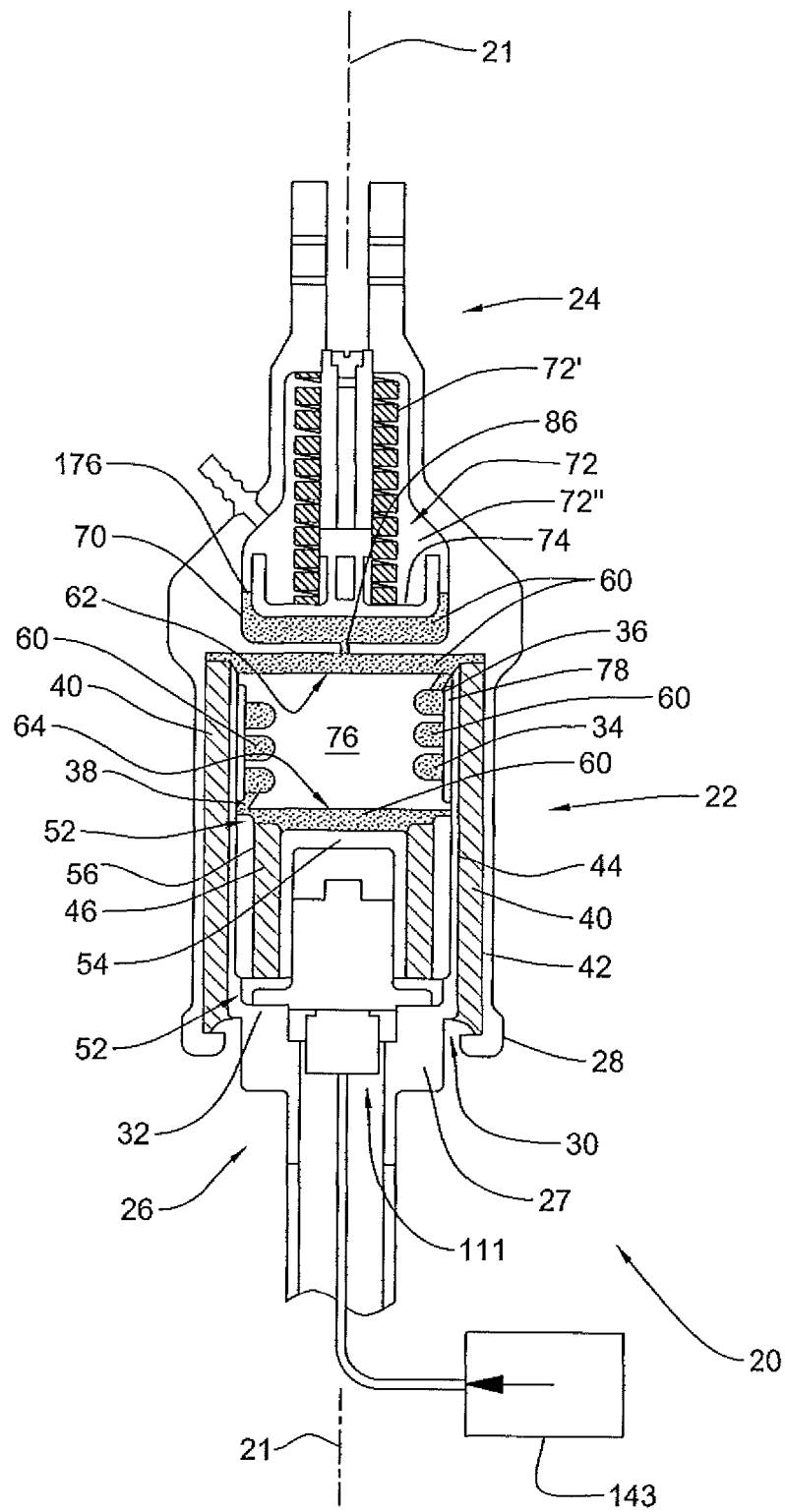
FIG. 1A-1D illustrate embodiments of powered fluid containing support strut isolators.
Figure 1B:
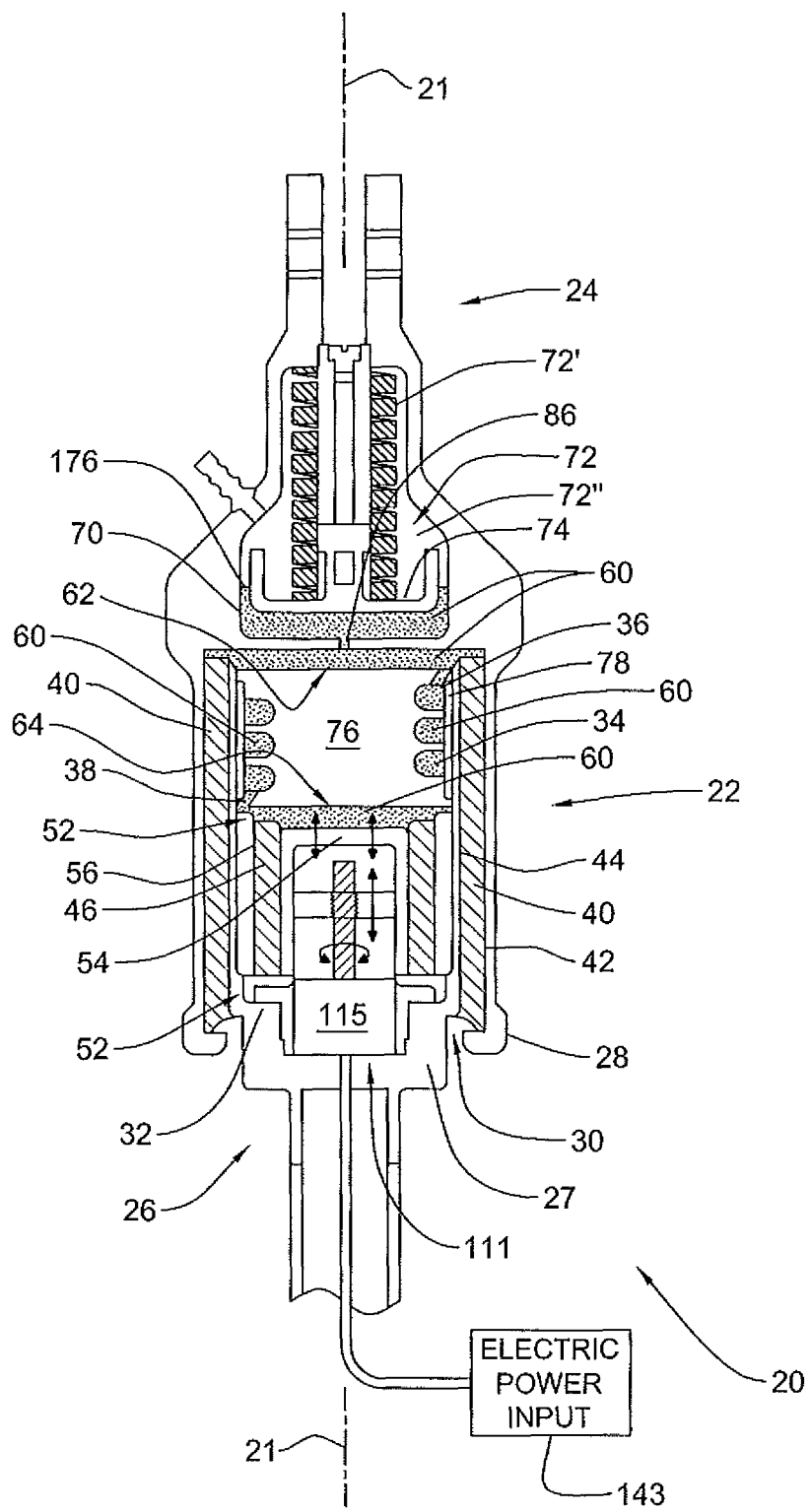
Figure 1C:
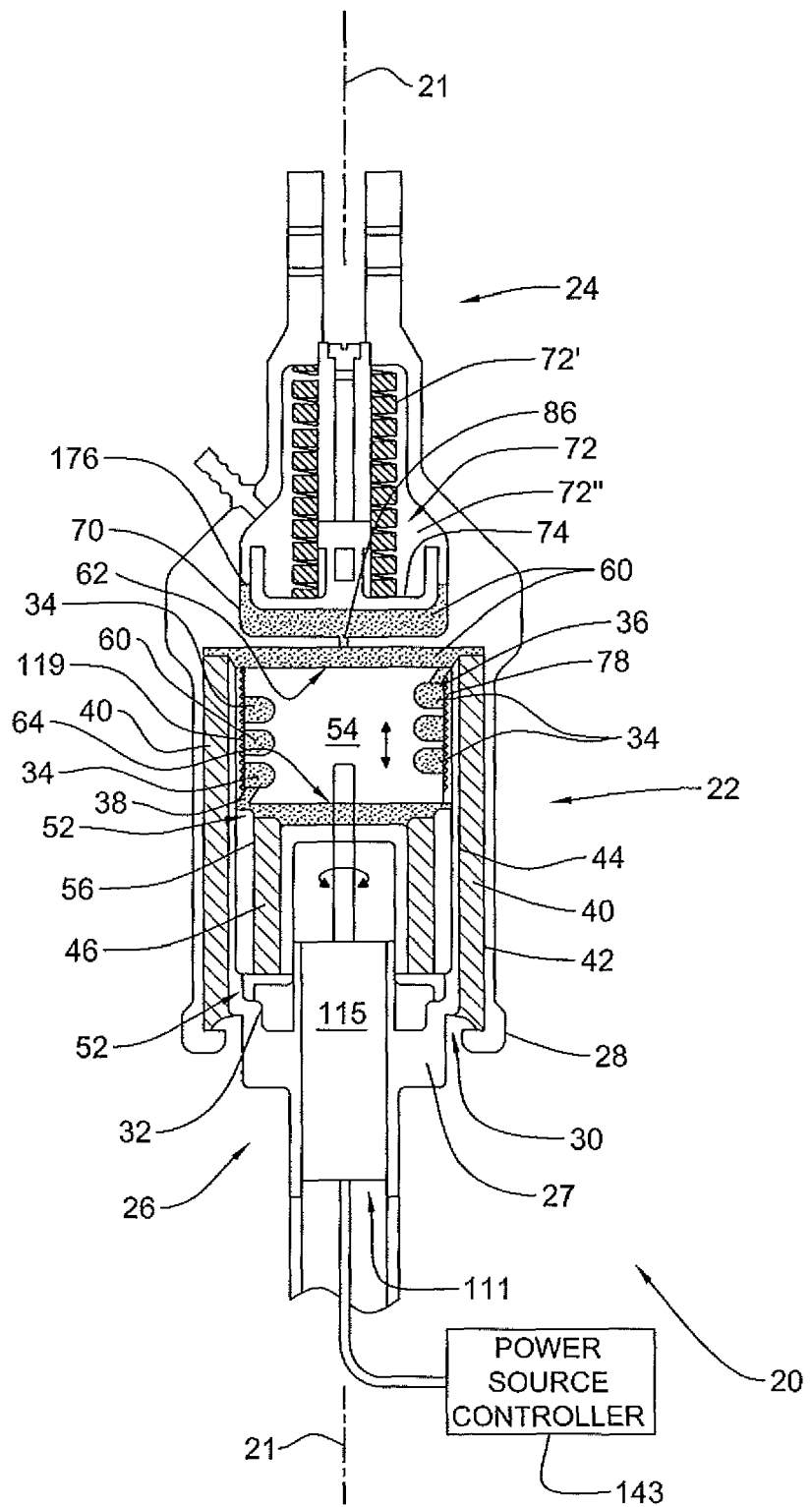
Figure 1D:
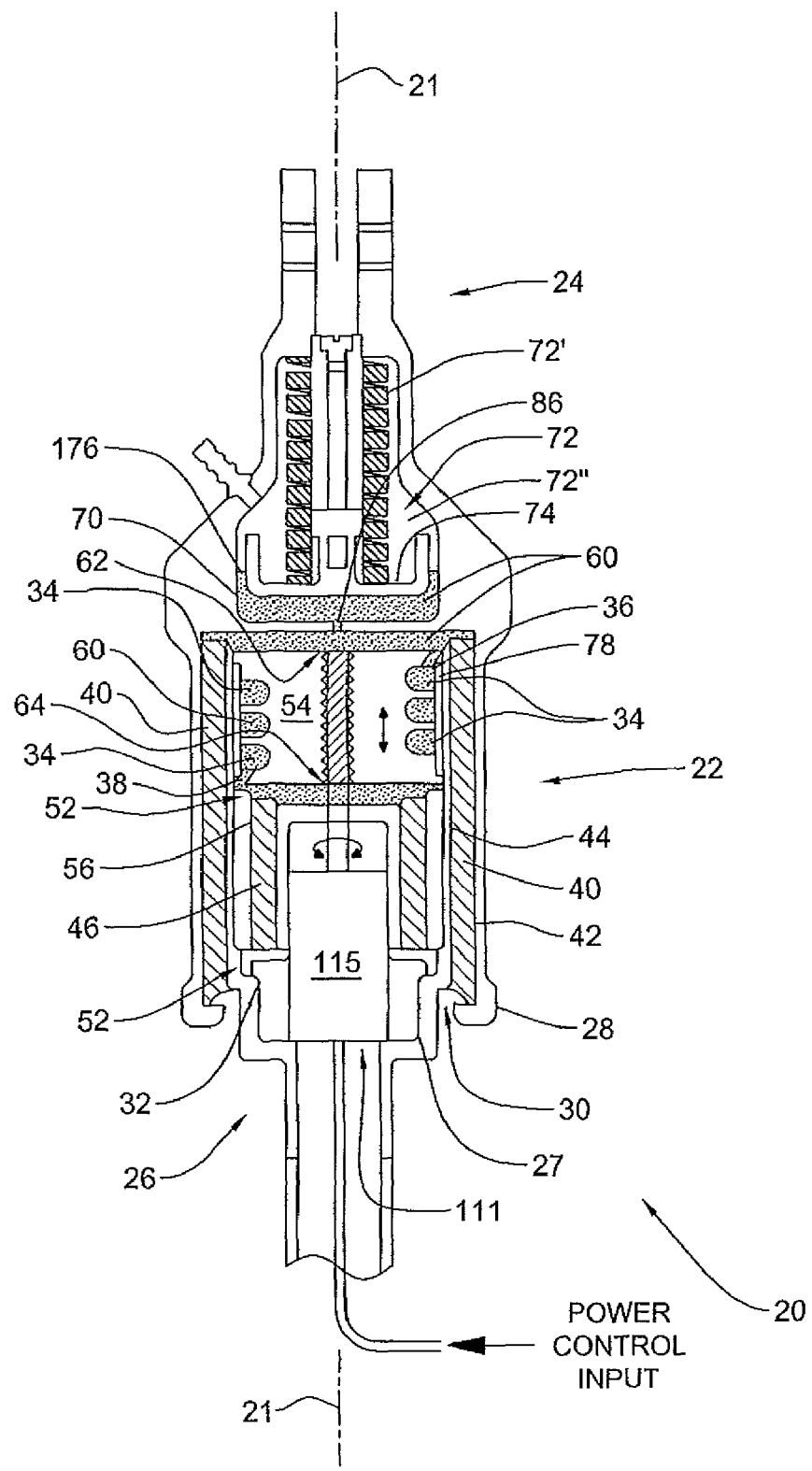

In an embodiment the invention includes a support strut 20 for supporting an axial load, the support strut including a strut isolator 22. The strut isolator 22 having a first strut end member 24 and a second strut end member 26, the second strut end distal from the first strut end. The first strut end member including an outer rigid housing 28, the outer rigid housing defining an inner cavity 30, the second strut end member including an inner rigid member 32, the inner rigid member 32 extending into the outer rigid housing inner cavity 30, the inner rigid member 32 including an inertial track 34 extending in a direction from the first strut end towards the second strut end, the inertial track having a first entrance end 36 proximate the first strut end 24 and a second entrance end 38 proximate the second strut end 26, the inner rigid member 32 including an internal housing cavity 52, a first outer tubular elastomer 40 disposed between the outer rigid housing 28 and the inner rigid member 32, the first outer tubular elastomer 40 bonded to a first inner rigid surface 42 of the outer rigid housing 28, the first outer tubular elastomer bonded to a first outer rigid surface 44 of the inner rigid member 32. The strut isolator 22 includes an isolator fluid 60. The outer rigid housing 28, and the inner rigid member 32 providing a first variable volume fluid chamber 62 proximate the first strut end 24 and the first track entrance end 36. The inner rigid member internal housing cavity 52 housing a second variable volume fluid chamber 64 proximate the second strut end 26 and the second track entrance end 38. The strut isolator 22 includes an actuator plunger 54 moved by a powered actuator 111. The actuator plunger 54 is preferably disposed proximate one of the variable volume fluid chambers, wherein a movement of the first strut end member in a first strut direction towards the second strut end member plungers the fluid from the first variable volume chamber through the track towards the second variable volume chamber, and an opposite movement of the first strut end member in a second direction away from the second strut end plungers the fluid from the second variable volume chamber through the track towards the first variable volume chamber, and an actuator plunger contracting stroke in a first actuator direction contracts the variable volume chamber, and an actuator plunger expanding stroke in an opposite second actuator direction expands the variable volume chamber. Preferably the actuator plunger 54 is disposed in the inner rigid member 32 proximate the second variable volume fluid chamber 64, with the powered actuator 111 moving the plunger 54 to contract and expand the variable volume fluid chamber 64. Preferably the isolator strut includes a variable volume compensator chamber 70. Preferably the isolator strut includes a variable volume fluid thermal expansion compensator chamber proximate a variable volume chamber. Preferably the isolator strut includes variable volume compensator chamber 70 proximate the first variable volume chamber 62. Preferably the variable volume fluid compensator 70 is comprised of a first mechanical spring and a second gas spring, preferably providing a double spring loaded compensator piston. Preferably the invention provides an inertia track fluid isolator with an at least two spring loaded compensator piston, preferably with the at least double sprung compensator sprung with a mechanical resilient spring and a pressurized gas charge spring. Preferably the isolator strut includes a variable volume fluid compensator 70 comprised of a first mechanical spring 72' and a second gas spring 72". Preferably the isolator strut includes a second end inner tubular elastomer 46, the second end inner tubular elastomer disposed between the actuator plunger 54 and an inner rigid member internal housing cavity inner wall 52. Preferably the actuator plunger 54 and second end inner tubular elastomer 46 forming part of the second variable volume chamber 64. Preferably the second inner end tubular elastomer 46 is disposed between the actuator and the inner rigid member proximate the second strut end. Preferably the second end tubular elastomer 46 is bonded to a rigid surface inner surface of the inner rigid member 32. Preferably the second inner tubular elastomer 46 is bonded to a outer rigid surface of the actuator plunger 54. Preferably the second inner end tubular elastomer 46 has a second outer diameter OD2. The actuator 111 applies fluid moving external forces to plunger 54 from an external supplied power source. Preferably plunger 54 is attached to the inner member through the smaller cylindrical elastomeric spring tubeform 46. Preferably the plunger force actuator 111 is chosen from the plunger actuator group consisting of a piezoelectric force actuator, piezo-ceramic force actuator, shape memory alloy force actuator, electromagnetic force actuator or a hydraulic force actuator. A hydraulic force actuator 113 is shown in the FIG. 3-4. In preferred embodiments the hydraulic force actuator 113 is a servo-hydraulic actuator. Preferably the actuator plunger is a hydraulic powered actuator plunger, preferably a servohydraulic powered actuator. Electromagnetic force actuators 115 are shown in FIG. 1B-1D. In preferred embodiments the electromagnetic force actuator 115 is an electromagnetic motor, preferably an electric rotary motor, preferably a servo motor. Preferably the actuator plunger is an electric powered actuator plunger, preferably a electromagnetic motor actuator plunger, preferably with a rotary motor with a plunger drive link, with the rotary motor output converted to a linear back and fourth plunger motion. In FIG. 1B rotary motor 115 drives plunger 54 through a drive link, such as a ball screw, with the rotary motion output of the electromagnetic rotary motor 115 converted to linear movement of plunger 54. In FIG. 1C rotary motor 115 drives plunger 54 with inertia track 34 back and fourth between variable volume chambers 62 and 64. In FIG. 1C rotary servomotor 115 through its rotary motion output drive shaft rotates plunger 54, which contains the inertia track 34, with rotating plunger 54 having plunger threads 119 such that the rotating motion of plunger 54 moving the threaded plunger between the variable volume chambers 62 and 64. In embodiments such as shown in FIG. 1C the output shaft of rotary motor 115 is connected with the rotating plunger 54 through a linear slide. In FIG. 1D rotary motor 115 drives plunger 54 with inertia track 34 back and fourth between variable volume chambers 62 and 64. In FIG. 1D rotary servomotor 115 through its rotary motion threaded output drive shaft moves plunger 54 having inner threads meshing with the motor threaded output drive shaft, with inertia track plunger 54 moved back and fourth between the variable volume chambers 62 and 64 by the clockwise and counterclockwise output rotation of electric rotary motor 115, preferably with the plunger 54 having inner threads along the motor output shaft and outer perimeter linear slides to provide for the linear reciprocating motion of the inertia track plunger between the chambers 62 and 64. Preferably the powered active vibration control system isolator has a fluid working pressure, preferably in the range of about 100 to 1000 p.s.i. in the working operation of the isolator. Preferably under dynamic working conditions the actuator force is amplified by the resonant response of the inertia of the fluid and the elasticity of the fluid chambers, preferably with a maximum response at a desired frequency to maximize the ratio of the output force to the input force.

In an embodiment the invention includes a support strut isolator. The isolator preferably has a first strut end member 24 and a second strut end member 26, the second strut end distal from the first strut end, the first strut end member including an outer rigid housing 28, the outer rigid housing defining an inner cavity 30, the second strut end member including an inner rigid member 32, the inner rigid member 32 extending into the outer rigid housing inner cavity 30. Preferably the inner rigid member 32 includes an inertial track 34 extending in a direction from the first strut end towards the second strut end, the inertial track having a first entrance end 36 proximate the first strut end 24 and a second entrance end 38 proximate the second strut end 26, the inner rigid member 32 including an internal housing cavity 52. The isolator preferably has a first outer tubular elastomer 40 disposed between the outer rigid housing 28 and the inner rigid member 32, the first outer tubular elastomer 40 bonded to a first inner rigid surface 42 of the outer rigid housing 28. Preferably the first outer tubular elastomer is bonded to a first outer rigid surface 44 of the inner rigid member 32, with the first outer tubular elastomer 40 having an inside diameter ID1. The isolator includes an isolator fluid. The outer rigid housing 28 and the inner rigid member 32 provide a first variable volume fluid chamber 62 proximate the first strut end 24, and preferably proximate the first track entrance end 36. The inner rigid member internal housing cavity 52 preferably houses a second variable volume fluid chamber 64 proximate the second strut end 26, and preferably proximate the second track entrance end 38. Preferably the second variable volume fluid chamber 64 includes an actuator plunger and a bonded second inner tubular elastomer, with the bonded second inner tubular elastomer having an inside diameter ID2, the bonded second inner tubular elastomer bonded to an outer plunger surface and an inner rigid member internal housing cavity inside bonding wall, the bonded second inner tubular elastomer inside diameter ID2<ID1. Preferably movement of the first strut end member in a first strut direction plungers the fluid from the first variable volume chamber through the track towards the second variable volume chamber, and an opposite movement of the first strut end member in a second direction plungers the fluid from the second variable volume chamber through the track towards the first variable volume chamber, and an actuator plunger contracting stroke in a first actuator direction contracts the second variable volume chamber, and an actuator plunger expanding stroke in an opposite second actuator direction expands the second variable volume chamber. The isolator preferably includes a variable volume compensator chamber, preferably with a spring loaded compensator piston.

In an embodiment the invention includes a longitudinal isolator. The longitudinal isolator has an exterior and a longitudinally extending axis, the isolator having a first end member and a second end member, the second end opposite from the first end along the longitudinally extending axis, the first end member including an outer rigid housing 28, the outer rigid housing defining an inner cavity 30. The longitudinal isolator second end member includes an inner rigid member 32, the inner rigid member 32 extending into the outer rigid housing inner cavity 30. Preferably the inner rigid member 32 includes an inertial track 34 extending in a direction from the first strut end towards the second strut end, the inertial track having a first entrance end 36 proximate the first strut end 24 and a second entrance end 38 proximate the second strut end 26. Preferably the inner rigid member 32 includes an internal housing cavity 52. The longitudinal isolator has an at least first outer tubular elastomer 40, 40', 40" disposed between the outer rigid housing 28 and the inner rigid member 32, the at least first outer tubular elastomer 40, 40', 40" bonded to a first inner rigid surface 42 of the outer rigid housing 28, the first outer tubular elastomer bonded to a first outer rigid surface 44 of the inner rigid member 32. Preferably the at least first outer tubular elastomer 40 has an inside diameter ID1 and an outside diameter OD1. The longitudinal isolator contains an isolator fluid. The longitudinal isolator outer rigid housing 28 and the inner rigid member 32 provide a first variable volume fluid chamber 62 proximate the first strut end 24, and preferably proximate a first track entrance end 36. The longitudinal isolator inner rigid member internal housing cavity 52 housing a second variable volume fluid chamber 64 proximate the second strut end 26, and preferably proximate the second track entrance end 38. Preferably the second variable volume fluid chamber 64 includes an externally powered actuator plunger and a bonded second inner tubular elastomer, the bonded second inner tubular elastomer having an inside diameter ID2 and an outside diameter OD2, the bonded second inner tubular elastomer inside diameter ID2 bonded to an outer plunger surface of the powered actuator plunger and the bonded second inner tubular elastomer outside diameter OD2 bonded to an inner rigid member internal housing cavity inside bonding wall, the bonded second inner tubular elastomer inside diameter ID2<ID1, wherein an actuator plunger contracting stroke in a first actuator direction contracts the second variable volume chamber, and an actuator plunger expanding stroke in an opposite second actuator direction expands the second variable volume chamber, and a movement of the first strut end member in a first strut direction plungers the fluid from the first variable volume chamber through the track towards the second variable volume chamber, and an opposite movement of the first strut end member in a second direction plungers the fluid from the second variable volume chamber through the track towards the first variable volume chamber. Preferably the isolator includes a variable volume compensator chamber. Preferably the variable volume compensator chamber includes a spring loaded compensator piston. Preferably the support strut isolator has an exterior and a longitudinally extending axis, the support strut isolator having a first end and a second end, the second end opposite from the first end along the longitudinally extending axis. Preferably the first end including an outer rigid longitudinally extending housing, the outer rigid longitudinally extending housing extending longitudinally towards the second end, the outer rigid longitudinally extending housing defining an inner cavity, the inner cavity containing a first variable volume chamber and a second variable volume chamber with an isolator fluid. Preferably the second strut end including a rigid structural extension longitudinally extending from the isolator exterior into the inner cavity, the rigid structural extension including an inner rigid member. Preferably the inner rigid member includes an inertial fluid track extending in a direction from the first end towards the second end, the inertial fluid track having a first entrance end in fluid communication with the first variable volume chamber and a second entrance end in fluid communication with the second variable volume chamber. Preferably a bonded elastomer tubular spring between the inner rigid member and the outer rigid housing provides a high static spring stiffness, preferably a spring stiffness of at least 3,000 lbs/inch. The second variable volume fluid chamber 64 preferably includes an actuator plunger and a bonded inner tubular elastomer, the bonded inner tubular elastomer having an inside diameter ID2, the bonded inner tubular elastomer bonded to an outer plunger surface and an inner rigid member internal housing cavity inside bonding wall, wherein a vibration movement of the first strut end member in a first strut direction towards the second strut end member plungers the fluid from the first variable volume chamber through the track towards the second variable volume chamber, and an opposite vibration movement of the first strut end member in a second direction away from the second strut end plungers the fluid from the second variable volume chamber through the track towards the first variable volume chamber. Preferably an applied actuator power applied to the isolator actuator provides an actuator plunger contracting stroke in a first actuator direction which contracts the second variable volume chamber and an actuator plunger expanding stroke in an opposite second actuator direction which expands the second variable volume chamber.

In an embodiment the invention includes an aircraft suspension system for isolating an aircraft power unit having at least one aircraft power unit operation frequency. The aircraft suspension system comprised of at least one isolated suspension support strut, wherein the isolated suspension support strut includes an outer rigid isolator housing, the outer rigid isolator housing an at least first outer tubular elastomer, a first variable volume fluid chamber, and a second variable volume fluid chamber. Preferably the outer rigid isolator housing houses a tuned isolator fluid inertial track between the first variable volume fluid chamber and the second variable volume fluid chamber, the tuned isolator fluid inertial track providing for a flow of an isolator fluid between the first variable volume fluid chamber and the second variable volume fluid chamber, the tuned isolator fluid inertial track having a tuned frequency isolation notch band, the frequency notch band centered about a center frequency, and having a notch band width, with the notch band width encompassing the power unit operation frequency, and the isolated suspension support strut outer rigid isolator housing including a plungering actuator, the plungering actuator powered to increase the flow of the isolator fluid.

In an embodiment the invention includes a rotary aircraft motive power unit suspension system for isolating a rotary aircraft motive power unit having at least one aircraft motive power unit operation frequency (preferably the rotor blade N per Rev). The rotary aircraft motive power unit suspension system includes at least one longitudinal isolated powered suspension strut, wherein the longitudinal isolated powered suspension strut includes a powered strut isolator. Preferably the strut isolator has a tuned isolator fluid inertial track path with a tuned frequency isolation notch band, the tuned frequency isolation notch band centered about a center notch frequency, the tuned frequency isolation notch band having a notch band width and an unpowered center notch magnitude, with the notch band width encompassing the at least one aircraft motive power unit operation frequency. Preferably the powered strut isolator includes a powered actuator plunger for contracting and expanding a variable volume fluid chamber. Preferably the power actuator is driven at a powered frequency wherein the tuned frequency isolation notch band center notch magnitude is increased.

In an embodiment the invention includes a method of upgrading a helicopter. In an embodiment upgrading preferably includes retrofitting with a new strut, with the old strut linkage unpowered. In a preferred embodiment the method includes retrofitting with a new strut, with the old replaced strut linkage powered. The method includes providing a helicopter having a first used support strut member for supporting an axial load between a first strut helicopter attachment and a second strut helicopter attachment. The method includes detaching the first used support strut member from the first strut helicopter attachment and the second strut helicopter attachment. The method includes providing an upgrade support strut 20 for supporting the axial load. Preferably the upgrade support strut includes a strut isolator 22. Preferably the strut has a first strut end member 24 and a second strut end member 26, the second strut end distal from the first strut end, the first strut end member including an outer rigid housing 28, the outer rigid housing defining an inner cavity 30. Preferably the second strut end member includes an inner rigid member 32, the inner rigid member 32 extending into the outer rigid housing inner cavity 30. Preferably the inner rigid member 32 including an inertial track 34 extending in a direction from the first strut end towards the second strut end, the inertial track having a first entrance end 36 proximate the first strut end 24 and a second entrance end 38 proximate the second strut end 26, the inner rigid member 32 including an internal housing cavity 52. Preferably the strut includes an at least first outer tubular elastomer 40, 40', 40" disposed between the outer rigid housing 28 and the inner rigid member 32, the first outer tubular elastomer 40 bonded to a first inner rigid surface 42 of the outer rigid housing 28, the first outer tubular elastomer bonded to a first outer rigid surface 44 of the inner rigid member 32. The strut includes an isolator fluid, with the outer rigid housing 28, and the inner rigid member 32 providing a first variable volume fluid chamber 62 proximate the first strut end 24 and a second variable volume fluid chamber 64 proximate the second strut end 26. Preferably the strut includes an actuator plunger 54, the actuator plunger disposed proximate the inner rigid member 32 and proximate a variable volume fluid chamber. The method includes connecting an actuator power input to the strut. The method includes attaching the upgrade support strut to the first strut helicopter attachment and the second strut helicopter attachment wherein a movement of the first strut end member in a first strut direction towards the second strut end member plungers the fluid from the first variable volume chamber towards the second variable volume chamber, and an opposite movement of the first strut end member in a second direction away from the second strut end plungers the fluid from the second variable volume chamber towards the first variable volume chamber. Preferably a contracting stroke powered by the actuator power input in a first actuator direction contracts the second variable volume chamber, and an expanding stroke in an opposite second actuator direction expands the second variable volume chamber.

In an embodiment the invention includes a method of making a vibration reduced aircraft. The method includes providing an aircraft structure having an axial linkage load path between a first body attachment and a second body attachment, the axial linkage load path carrying an axial load between the first body attachment and the second body attachment and conducting a troublesome vibration between the first body attachment and the second body attachment, with the troublesome vibration having an aircraft operation frequency. The invention includes providing a support strut for supporting the axial load, the support strut including a strut isolator, the strut isolator having a first strut end member and a second strut end member, the second strut end distal from the first strut end, the first strut end member including an outer rigid housing, the outer rigid housing defining an inner cavity, the second strut end member including an inner rigid member, the inner rigid member extending into the outer rigid housing inner cavity. Preferably the inner rigid member includes an inertial track extending in a direction from the first strut end towards the second strut end, the inertial track having a first entrance end proximate the first strut end and a second entrance end proximate the second strut end, the inner rigid member including an internal housing cavity. Preferably at least a first outer tubular elastomer is disposed between the outer rigid housing and the inner rigid member, the at least first outer tubular elastomer bonded to a first inner rigid surface of the outer rigid housing, the first outer tubular elastomer bonded to a first outer rigid surface of the inner rigid member. The strut includes an isolator fluid, with the outer rigid housing and the inner rigid member providing a first variable volume fluid chamber proximate the first strut end, and a second variable volume fluid chamber proximate the second strut end 26. Preferably the strut includes an actuator plunger, the actuator plunger preferably disposed in the inner rigid member proximate the second variable volume fluid chamber. The invention includes attaching the support strut to the first body attachment and the second body attachment. The invention includes supplying an actuator power input to the strut, wherein a movement of the first strut end member in a first strut direction towards the second strut end member plungers the fluid from the first variable volume chamber towards the second variable volume chamber, and an opposite movement of the first strut end member in a second direction away from the second strut end plungers the fluid from the second variable volume chamber towards the first variable volume chamber. Preferably an actuator plunger contracting stroke powered by the actuator power input in a first actuator direction contracts the second variable volume chamber, and an actuator plunger expanding stroke in an opposite second actuator direction expands the second variable volume chamber, with the actuator power supplied to the strut to inhibit a transmission of the troublesome vibration between the first body attachment and the second body attachment.

In an embodiment the invention includes an isolated support strut for supporting an axial load. FIG. 1-4 show an axial support strut 20 for supporting an axial load. The support strut 20 includes a strut isolator 22. As shown in FIG. 1-4 the strut isolator 22 has a first strut end member 24 and a second strut end member 26, with the second strut end 26 distal from the first strut end 24. The first strut end member 24 includes an outer rigid nonelastomer housing 28, with the outer rigid housing 28 defining an inner cavity 30. The second strut end member 26 includes an inner rigid nonelastomer member 32, the inner rigid member 32 extending into and inside the outer rigid housing inner cavity 30. The second strut end member extends into the cavity 30 through an open end of the outer rigid housing inner cavity, preferably with a hollowed member rigid structural extension longitudinally extending through the open end. The inner rigid member 32 includes an inertial track 34 extending in a direction from the first strut end 24 towards the second strut end 26, the inertial track 34 having a first entrance end 36 proximate the first strut end 24 and a second entrance end 38 proximate the second strut end 26. Preferably the inertial track 34 is a circuitous circular nondirect non-line-of-sight helical path wrapped fluid conduit track.

Figure 2:
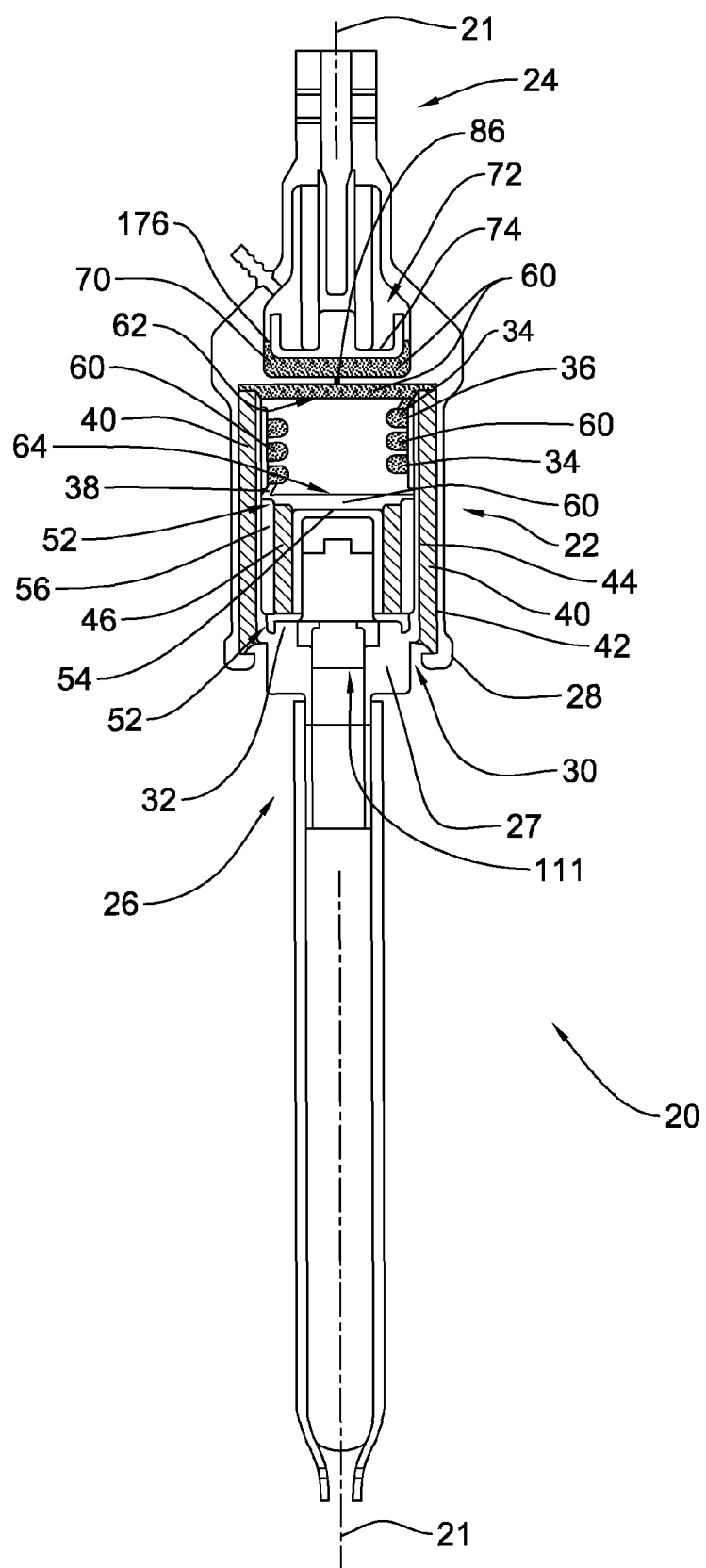
FIG. 2 illustrates an embodiment of a fluid containing support strut.
Figure 3A:
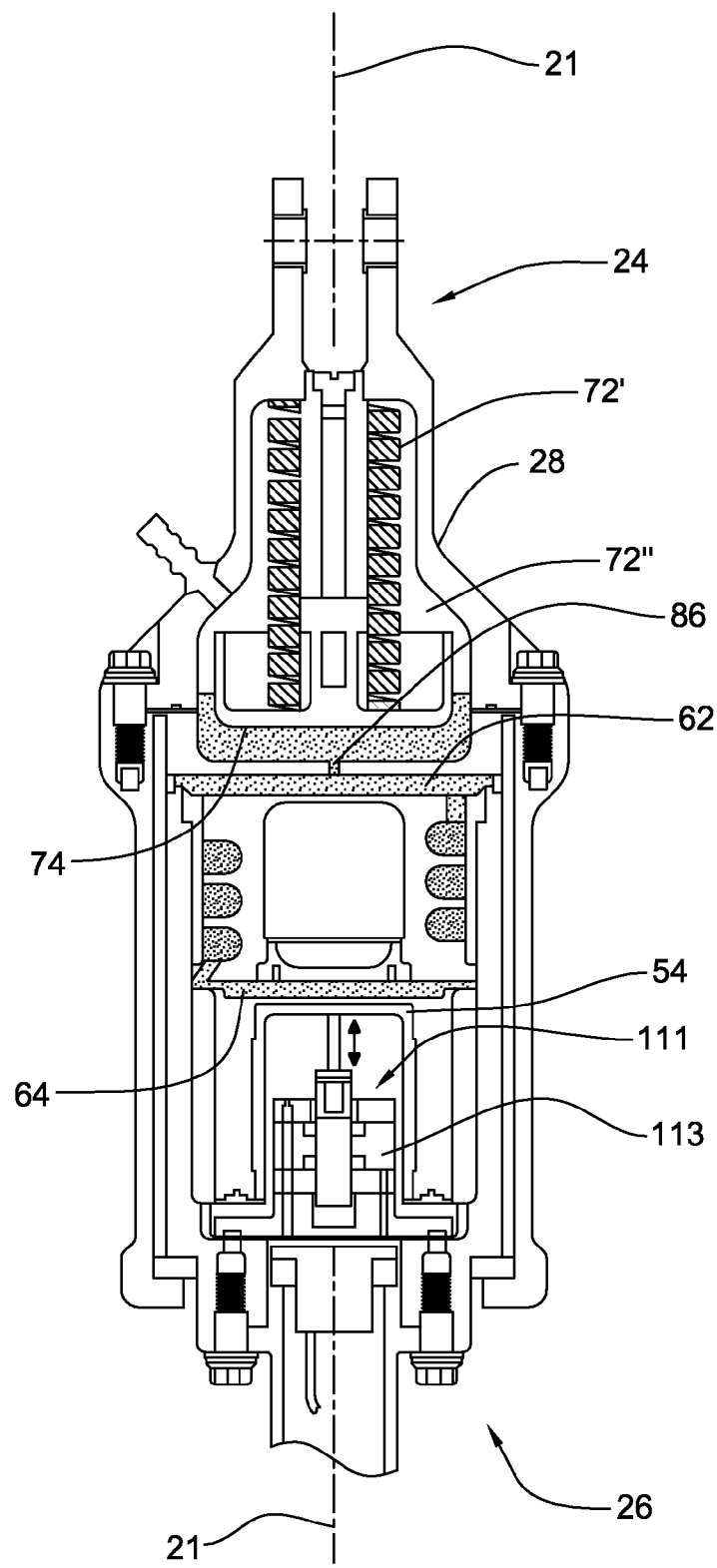
FIG. 3A-3C illustrates an embodiment of a powered fluid containing support strut isolator.
Figure 3B:
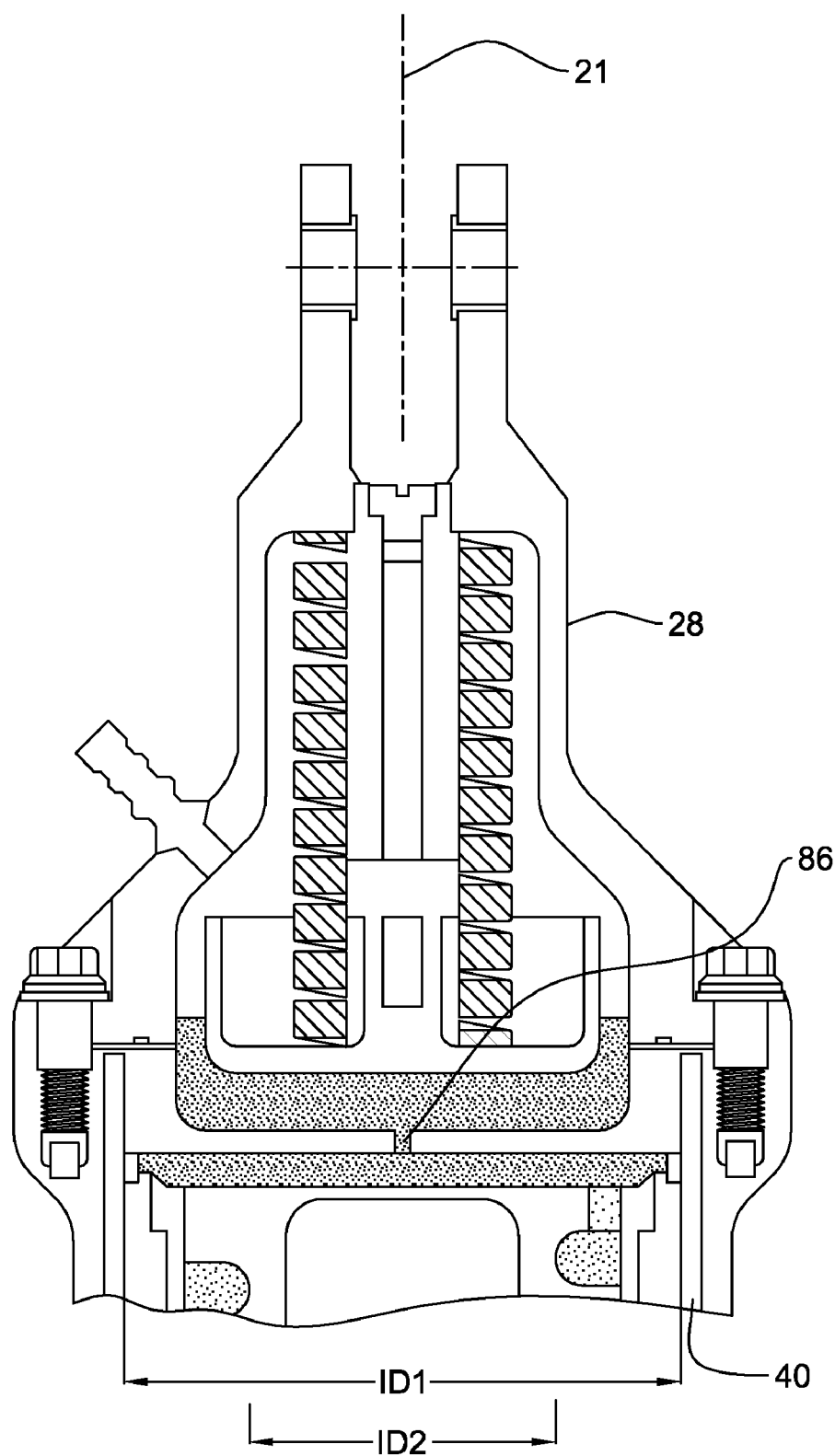
Figure 3C:
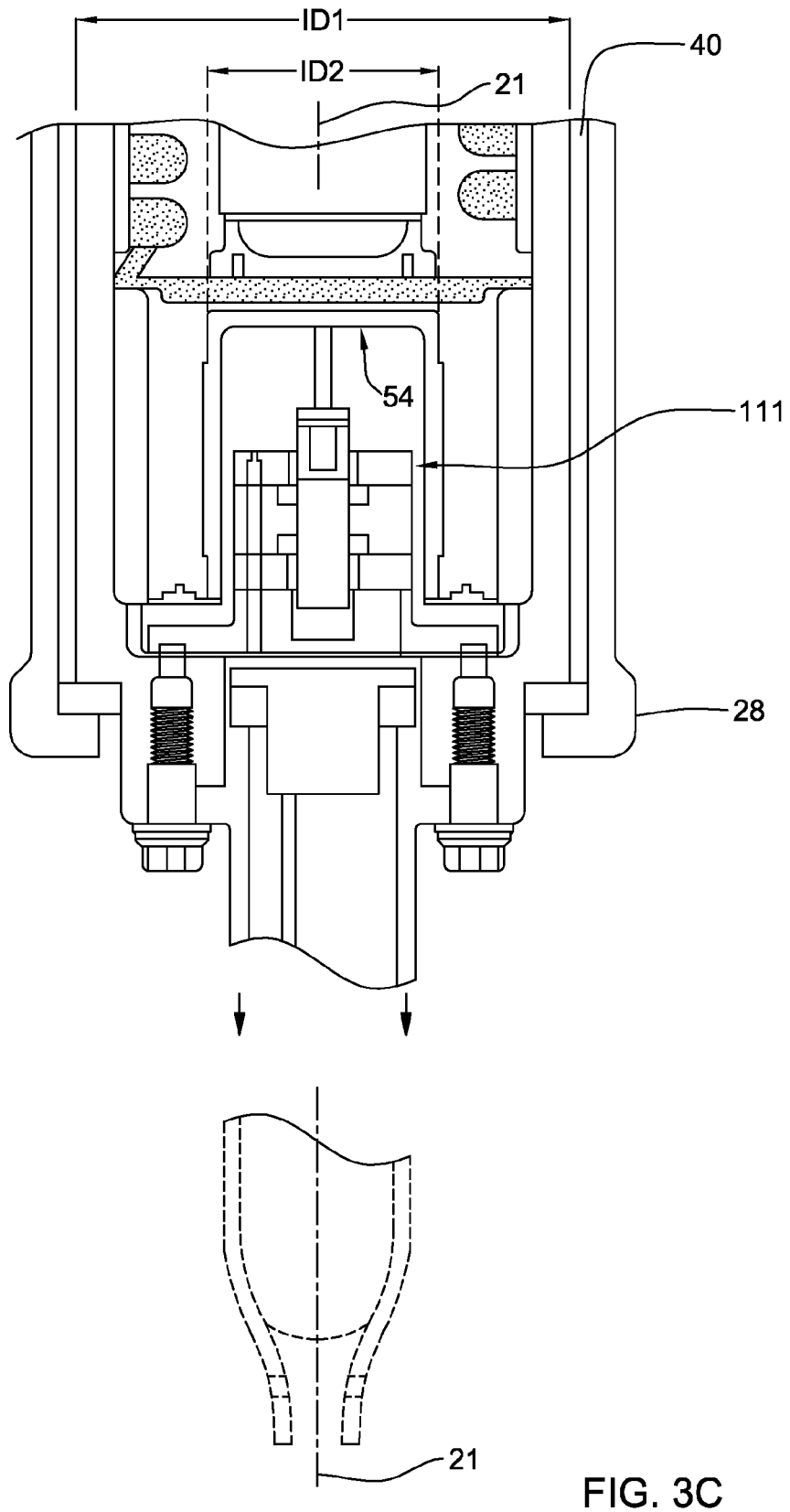

As shown in FIG. 1-3 the strut isolator 22 includes a first outer tubular spring elastomer 40 disposed between the outer rigid housing 28 and the inner rigid member 32, the first outer tubular spring elastomer 40 bonded to a first inner rigid surface 42 of the outer rigid housing 28, the first outer tubular spring elastomer 40 bonded to a first outer rigid surface 44 of the inner rigid member 32, and the first outer tubular spring elastomer 40 having an inner diameter ID. Preferably the first outer tubular spring elastomer 40 is comprised of a longitudinal cylindrical shell, preferably with a longitudinal length greater than the diameter of the first outer tubular spring elastomer.

As shown in FIG. 1-6 the strut isolator 22 preferably includes a second inner tubular elastomer 46, the second inner end tubular elastomer 46 disposed inside the inner rigid member 32 proximate the second strut end 26, the second inner end tubular elastomer 46 bonded to rigid surfaces and having an second outer diameter OD2. Preferably the second inner end tubular elastomer 46 is comprised of a cylindrical shell, preferably with a longitudinal length less than the first outer tubular spring elastomer longitudinal cylindrical shell longitudinal length.

As shown in FIG. 1-4 the strut isolator 22 preferably includes an isolator fluid 60, preferably an inertial tuning nonsolid mass liquid. Preferably isolator fluid 60 is a low viscosity isolator fluid having a viscosity$\leq$6 centistokes, preferably $\leq$5 centistokes. Preferably isolator fluid 60 has a viscosity of about 5 centistokes (5±1).

Preferably the second outer diameter OD2 is less than the inner diameter ID1.

Figure 4A:
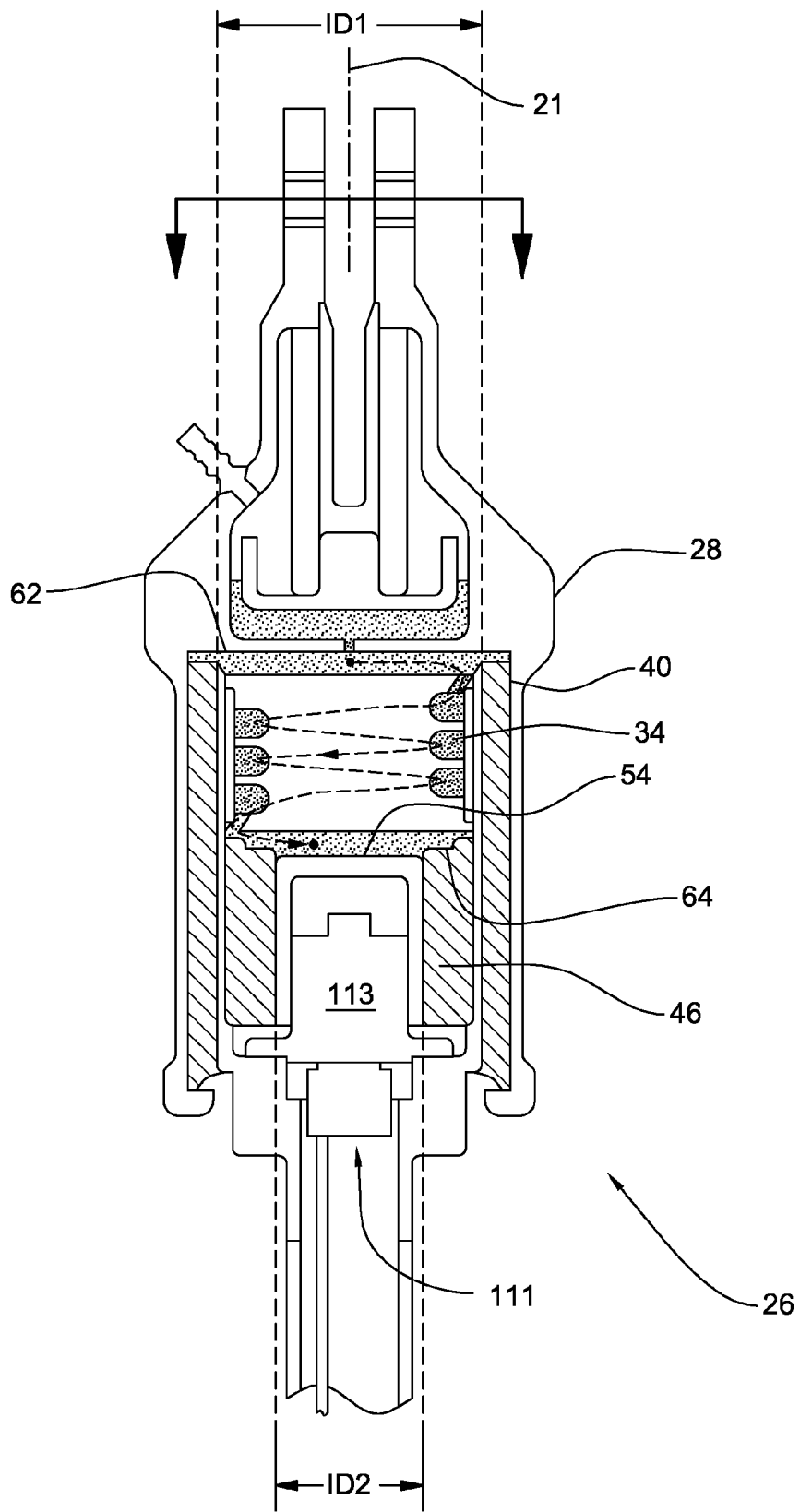
FIG. 4A-4D illustrate operation of a support strut isolator.
Figure 4B:
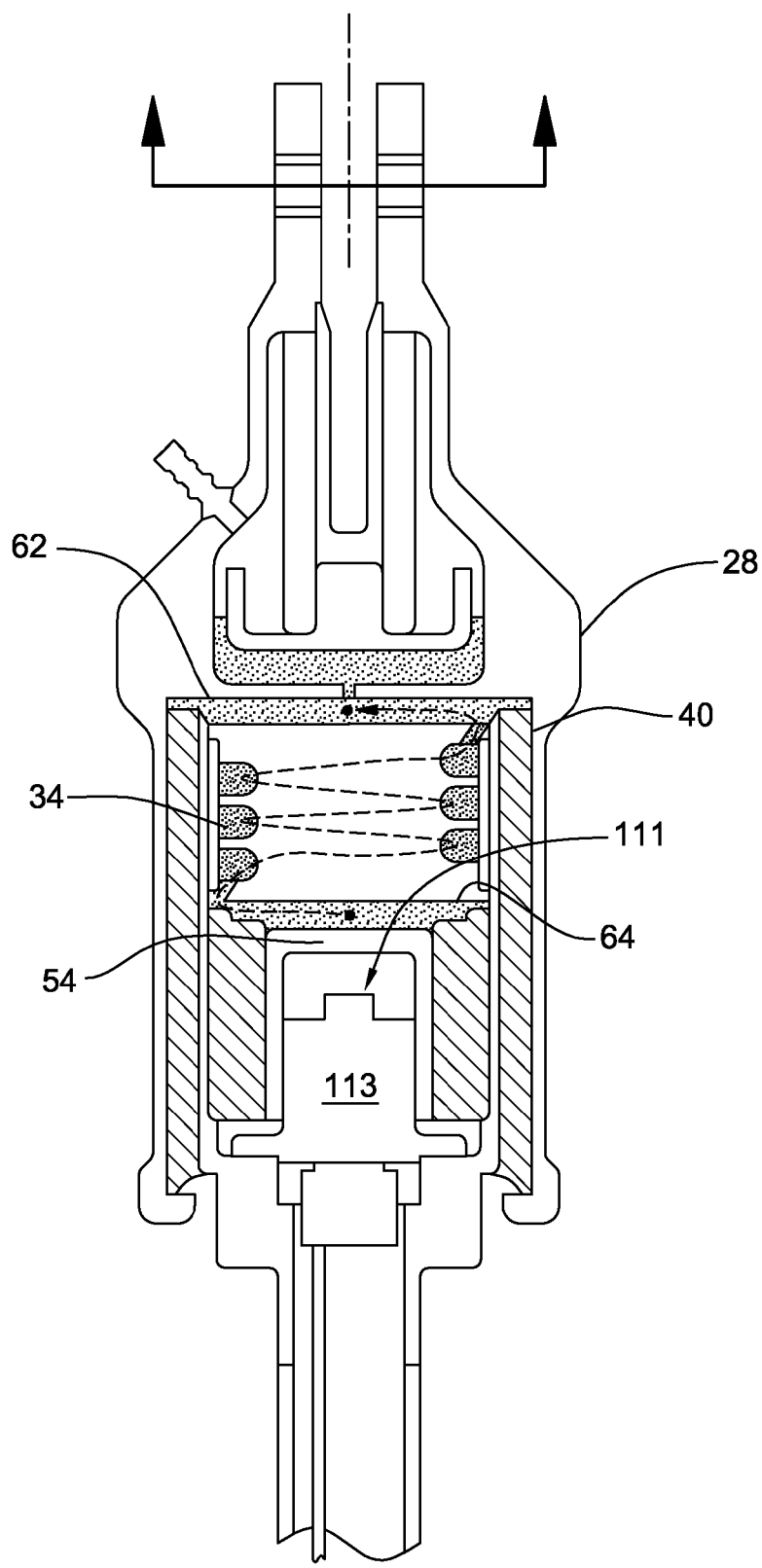

Preferably as shown in FIG. 4A-B the movement of the first strut end member 24 in a first strut direction plungers the fluid 60 from the second variable volume chamber 64 through the track 34 towards the first variable volume chamber 62, and an opposite movement of the first strut end member 24 in a second direction plungers the fluid 60 from the first variable volume chamber 62 through the track 34 towards the second variable volume chamber 64. Preferably the second strut end member 26 includes a rigid structural extension 27 extending from outside the exterior of the isolator housing 28, into the inner cavity. The isolator strut has a frequency notch band. The isolator provides structural attachments at each end of isolator with a direct load path through the isolator structural members to support the axial loads, preferably with the isolator providing a static spring stiffness of at least 3,000 lbs/inch (static spring stiffness). More preferably the isolator has a static spring stiffness of at least 13,000 lbs/inch, more preferably at least 23,000 lbs/inch, more preferably at least 35,500 lbs/inch. Most preferably the isolator has a static spring stiffness of at least 45,000 lbs/inch. The first outer tubular elastomer spring 40 preferably provides the high static spring stiffness, and carries the static load between the two ends 24, 26, preferably with the elastomer bonded to rigid substrate elastomer spring 40 providing a direct load path for the axial load. With such high static stiffness the isolator preferably minimizes the relative motion between its two ends 24, 26. Preferably the isolator provides a tuned frequency notch band, preferably a tuned frequency notch band in the range from about 10 Hz to 40 Hz. In an alternative preferred embodiment a tuned frequency notch band in the range from about 50 Hz to 500 Hz. Preferably the isolator provides a frequency notch band centered about a center frequency, and having a notch band width of at least 10% of the center frequency. Preferably the isolator provides a frequency notch band having a notch band depth providing at least a 50% reduction of the static spring stiffness, preferably at least 50% of the at least 3,000 lbs/inch static spring stiffness, preferably at least 50% of the 13,000 lbs/inch static spring stiffness, preferably at least 50% of the 23,000 lbs/inch static spring stiffness, preferably at least 50% of the 35,500 lbs/inch static spring stiffness, and preferably at least 50% of the 45,000 lbs/inch static spring stiffness.

Preferably the isolator strut includes a variable volume compensator nonpumping fluid chamber 70. Preferably the variable volume compensator nonpumping fluid chamber 70 includes a spring 72. In an embodiment the spring 72 is comprised of a gas spring. In an embodiment the spring 72 is comprised of elastomer spring. In an embodiment the spring 72 is comprised of a coil spring. Preferably the variable volume compensator nonpumping fluid chamber 70 includes a spring loaded compensator piston 74, and a compensator diaphragm 176. The variable volume compensator nonpumping fluid chamber 70 allows for thermal expansion and contraction of the fluid due to temperature changes while minimizing the pressure charge in the isolator, preferably with a pressure change less than 15%. Preferably the variable volume compensator is nonpumping and dynamically isolated from the pumping chambers 62 and 64 and the track 34. Preferably the isolator strut includes a variable volume fluid thermal expansion nonpumping compensator chamber 70 proximate the first variable volume chamber, preferably with a spring 72 that allows for thermal expansion and contraction of the fluid due to temperature changes while minimizing the pressure change in the isolator, preferably with a pressure change less than 15%, with the compensator chamber 70 comprising a nonpumping-dynamically isolated fluid chamber. Preferably the isolator strut includes a variable volume fluid thermal expansion nonpumping compensator chamber 70 connected with a relatively small fluid path orifice 86 to the first variable volume chamber wherein it is substantially dynamically isolated.

Figure 4C:
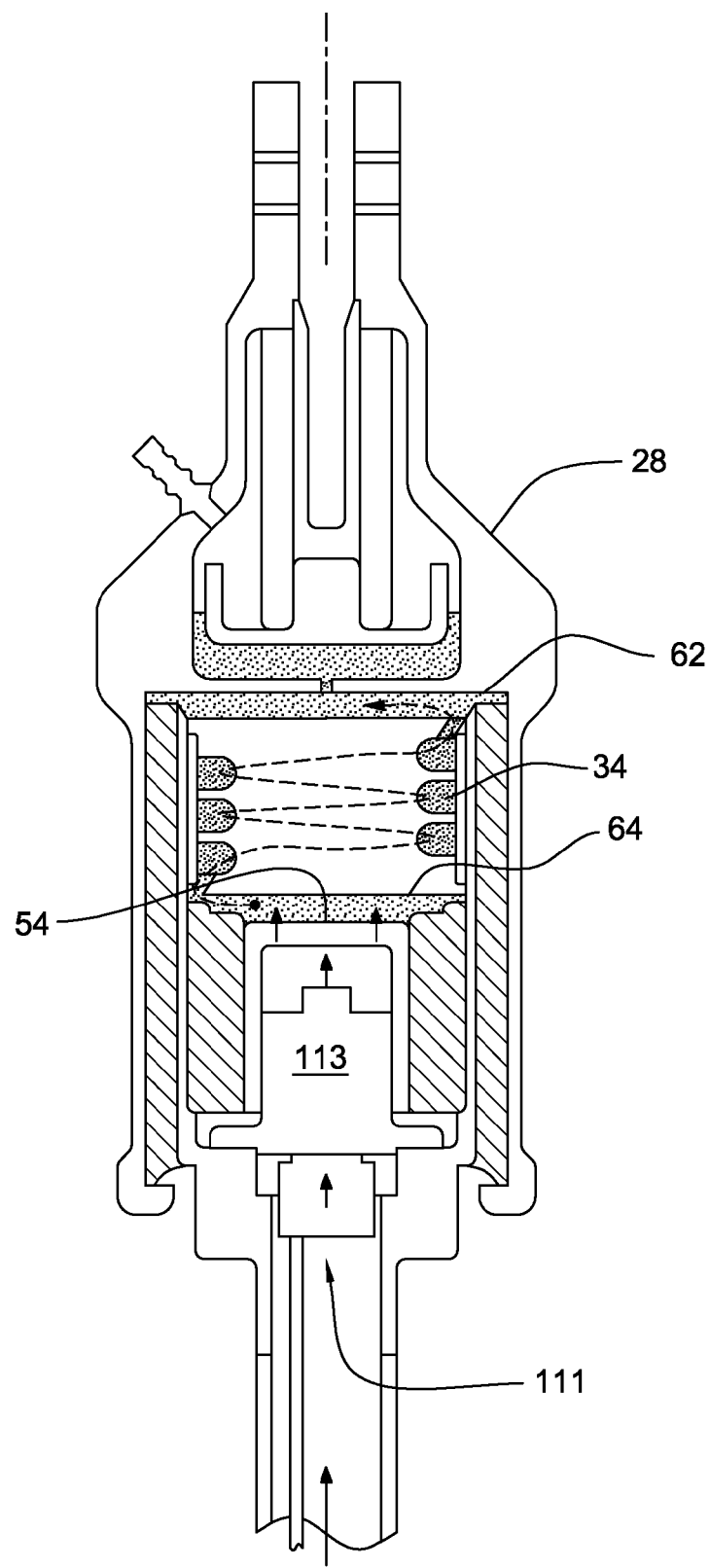
Figure 4D:
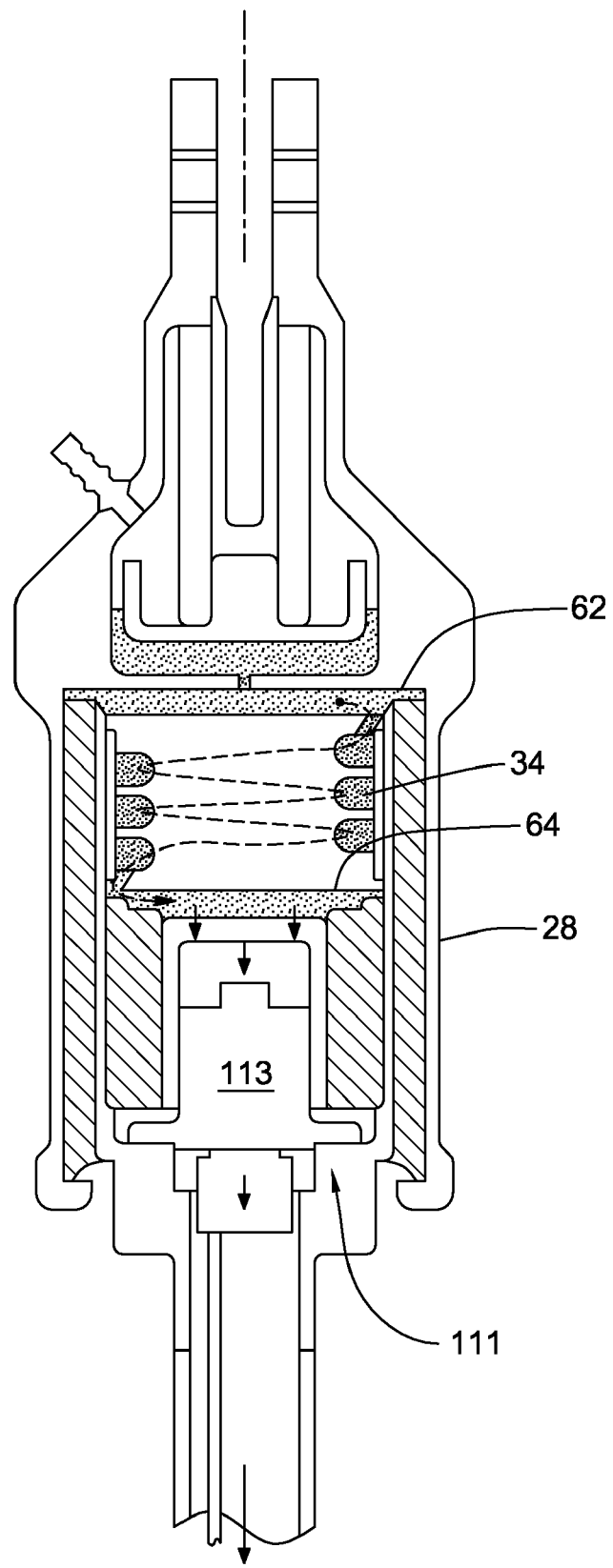

Preferably the isolator 22 has an actuator plunger area (Ap) greater than the cross-sectional area (At) of the track 34. The plunger area (Ap) is preferably the surface area in the variable volume chamber 64 that is plungering and pumping the fluid, preferably as shown in FIG. 4C-D the plunger pumping area (Ap) is preferably the actuator plunger surface area of the chamber 64.

Figure 5A:
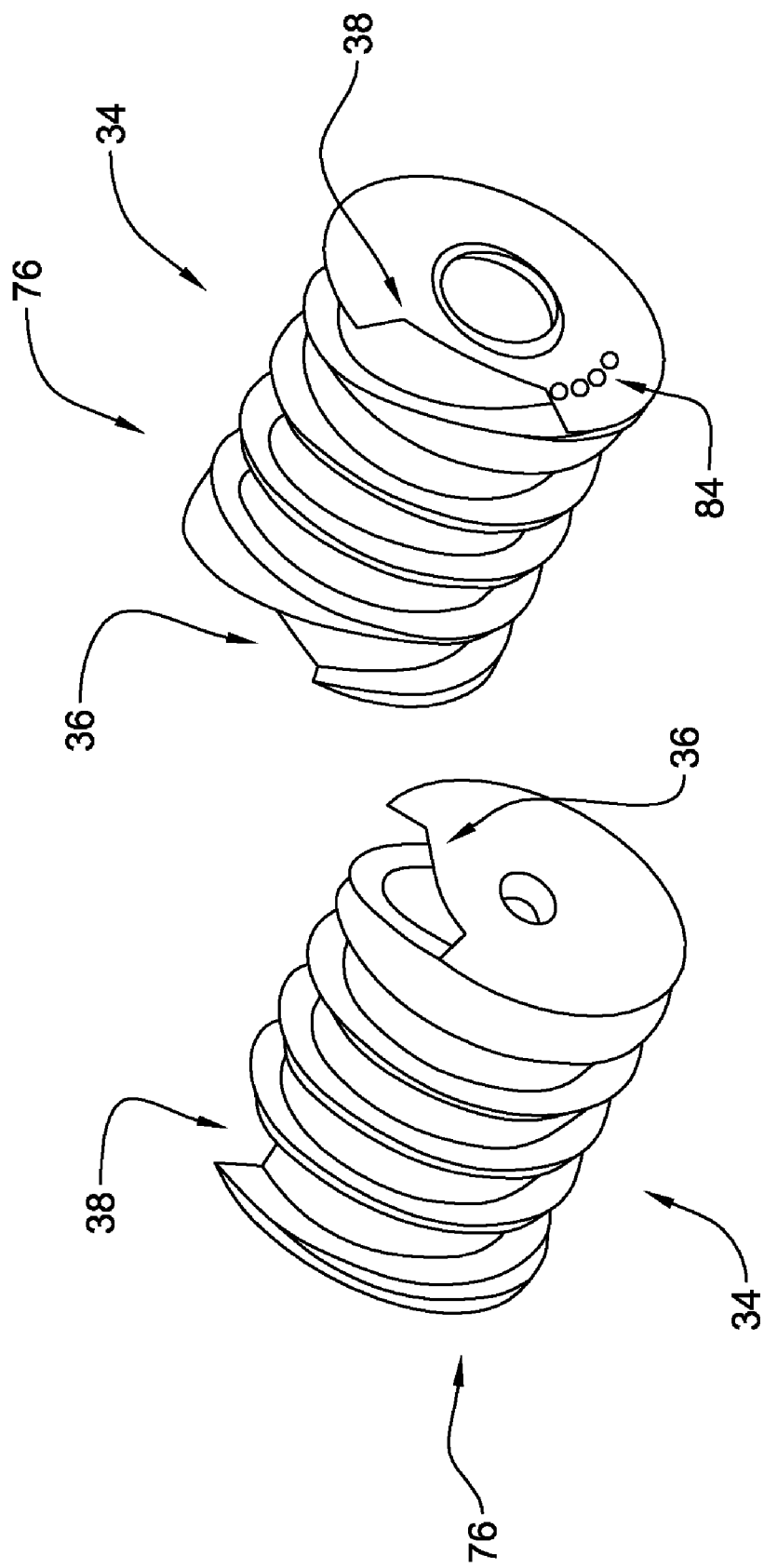
FIG. 5A-5F illustrate embodiments of inertia track members.
Figure 5B:
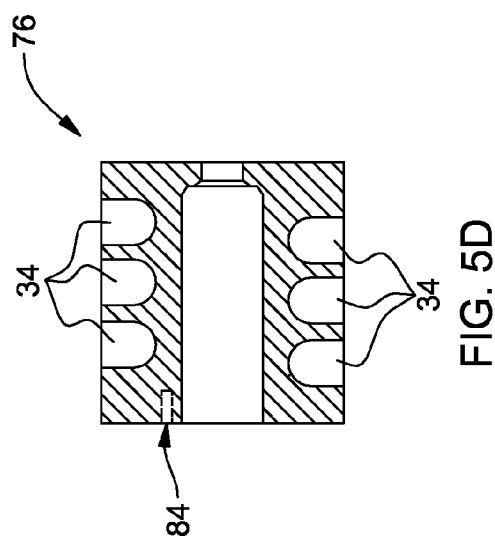
Figure 5C:
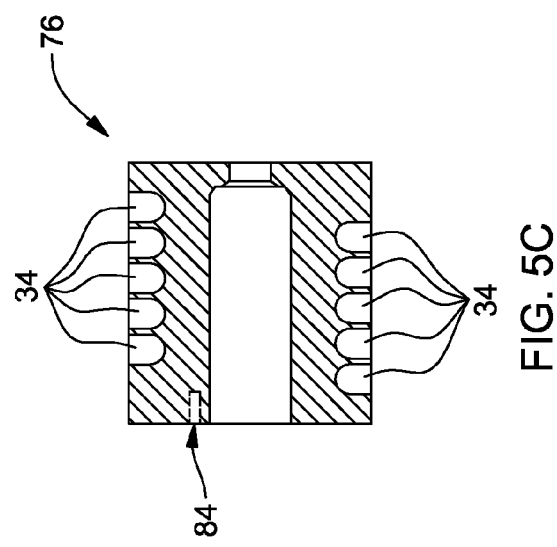
Figure 5D:
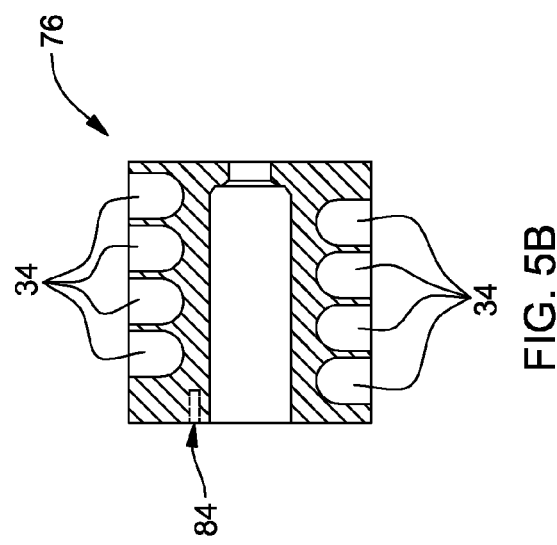
Figure 5F:
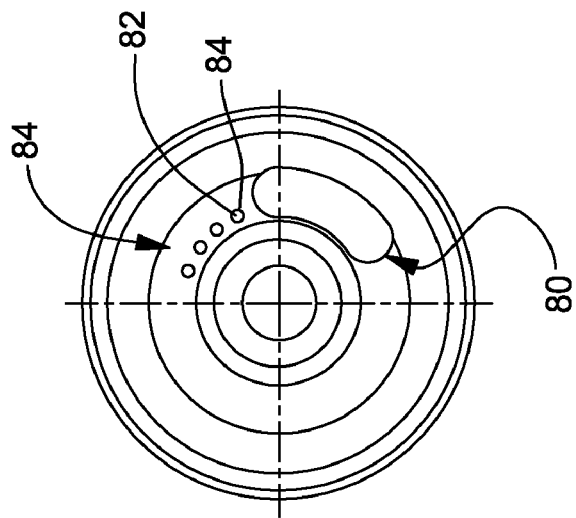
Figure 5E:
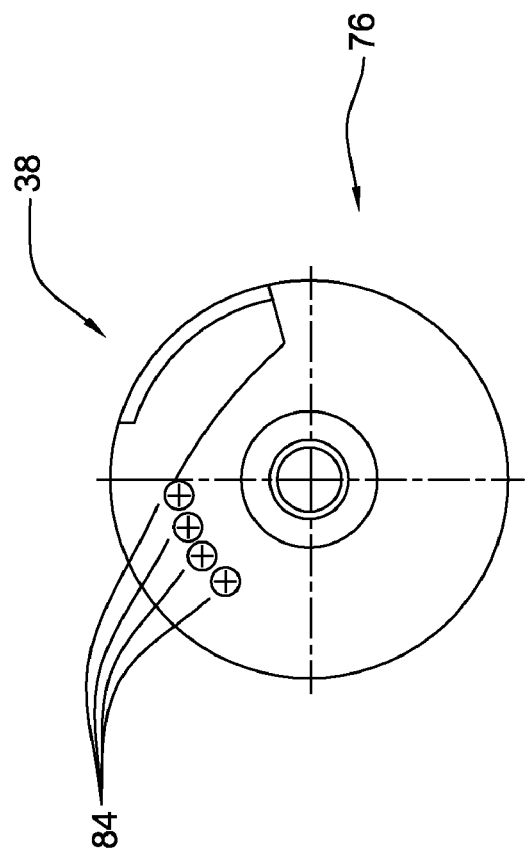
Figure 6A:
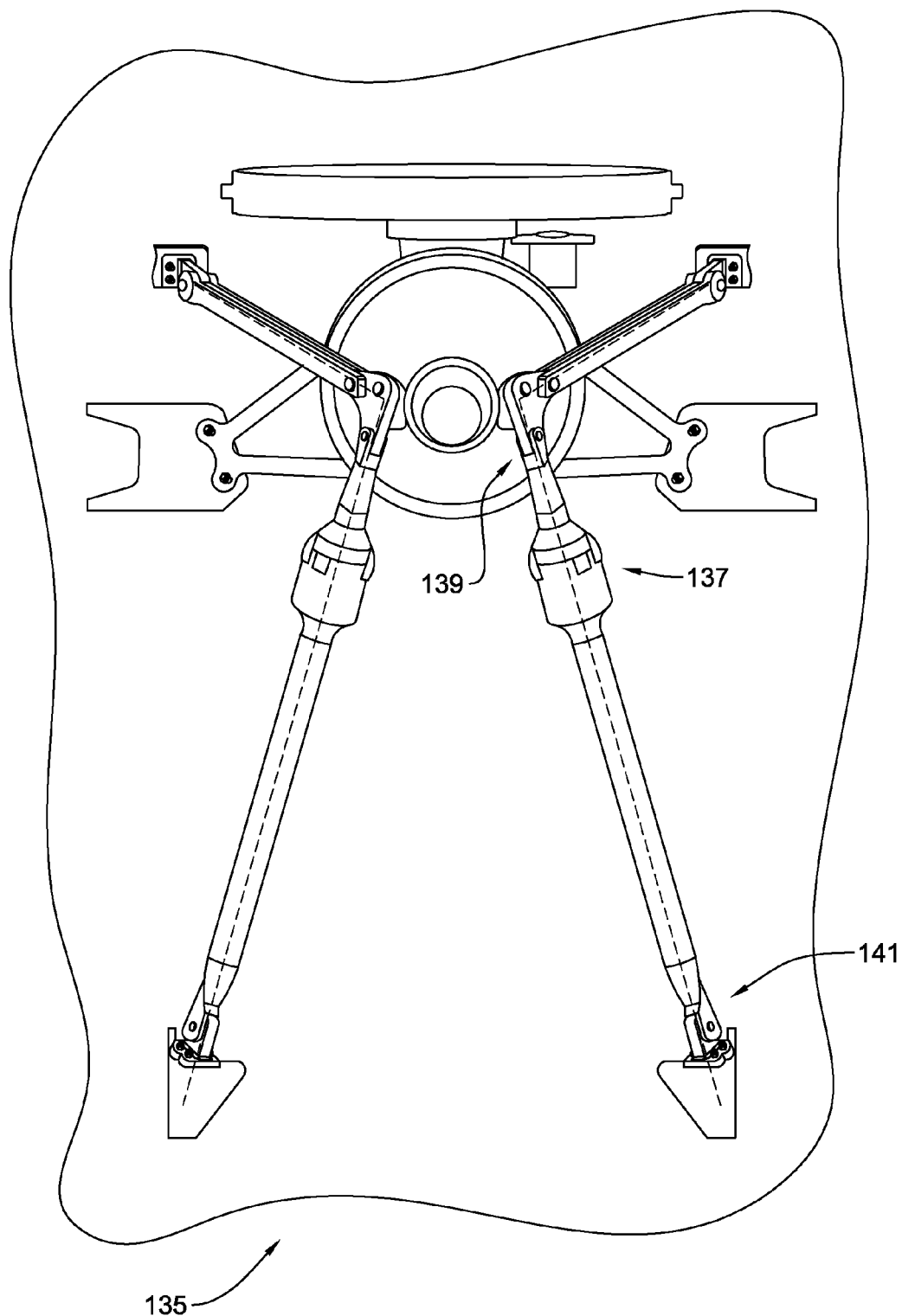
FIG. 6A-6G illustrate helicopter aircraft suspension systems and methods.
Figure 6B:
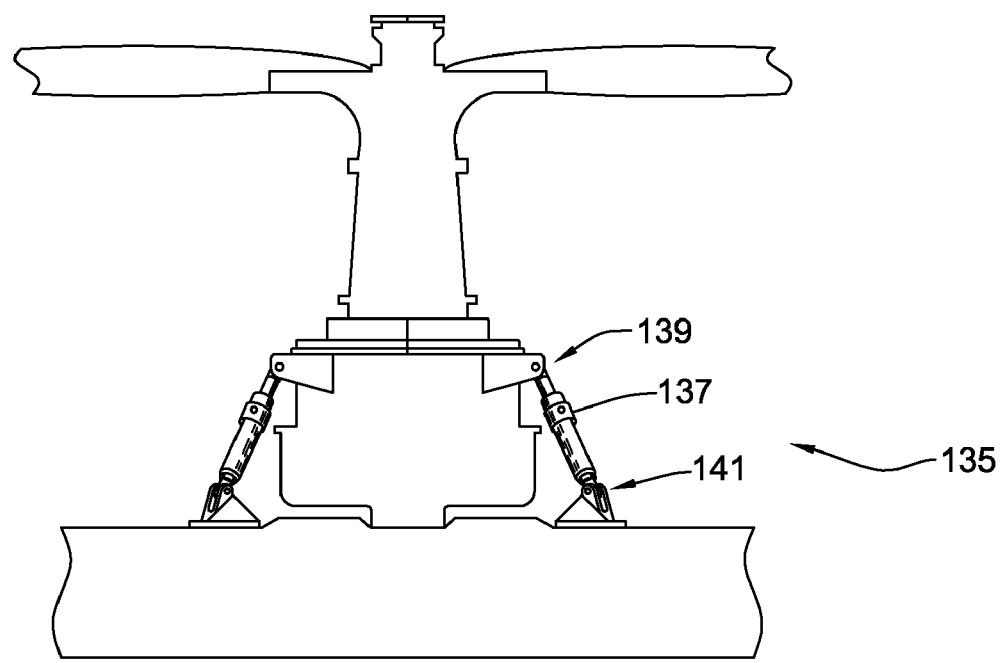
Figure 6C:
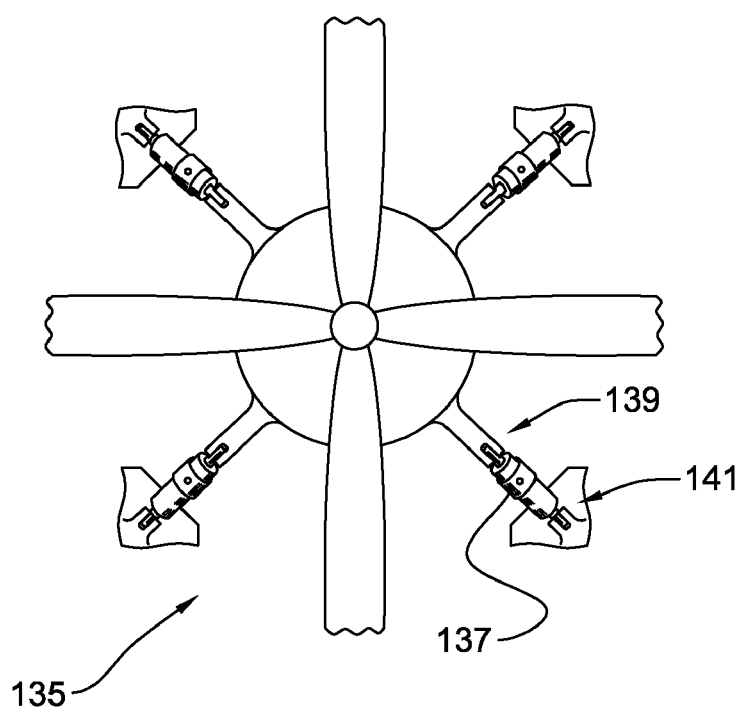
Figure 6D:
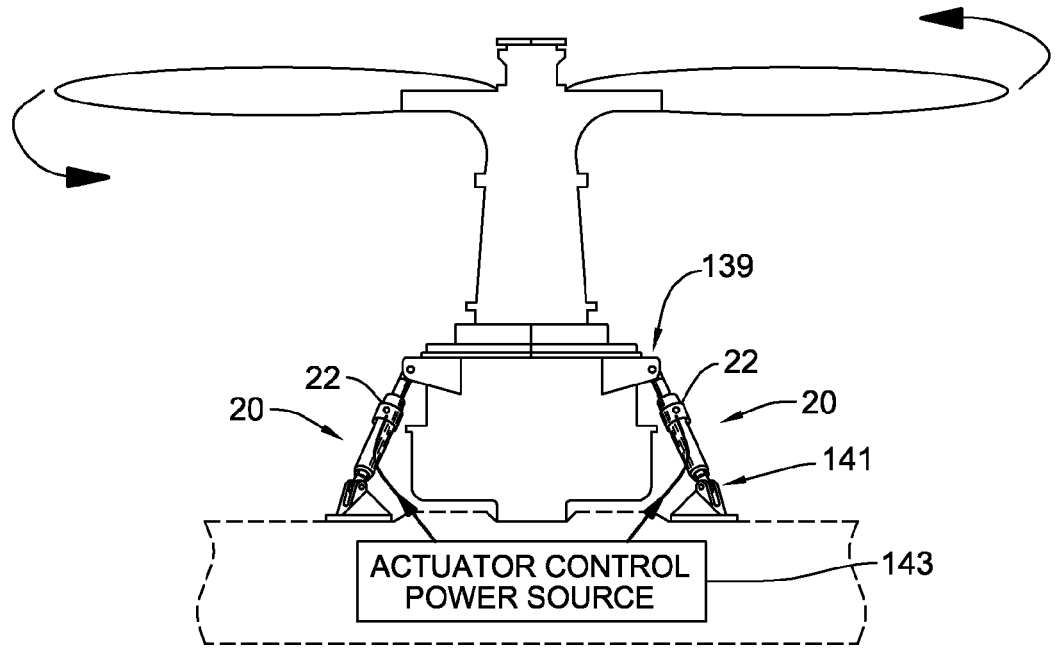
Figure 6E:
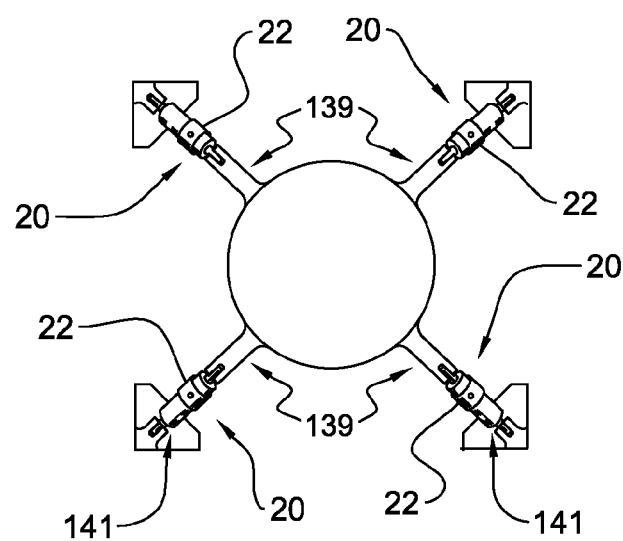
Figure 6F:
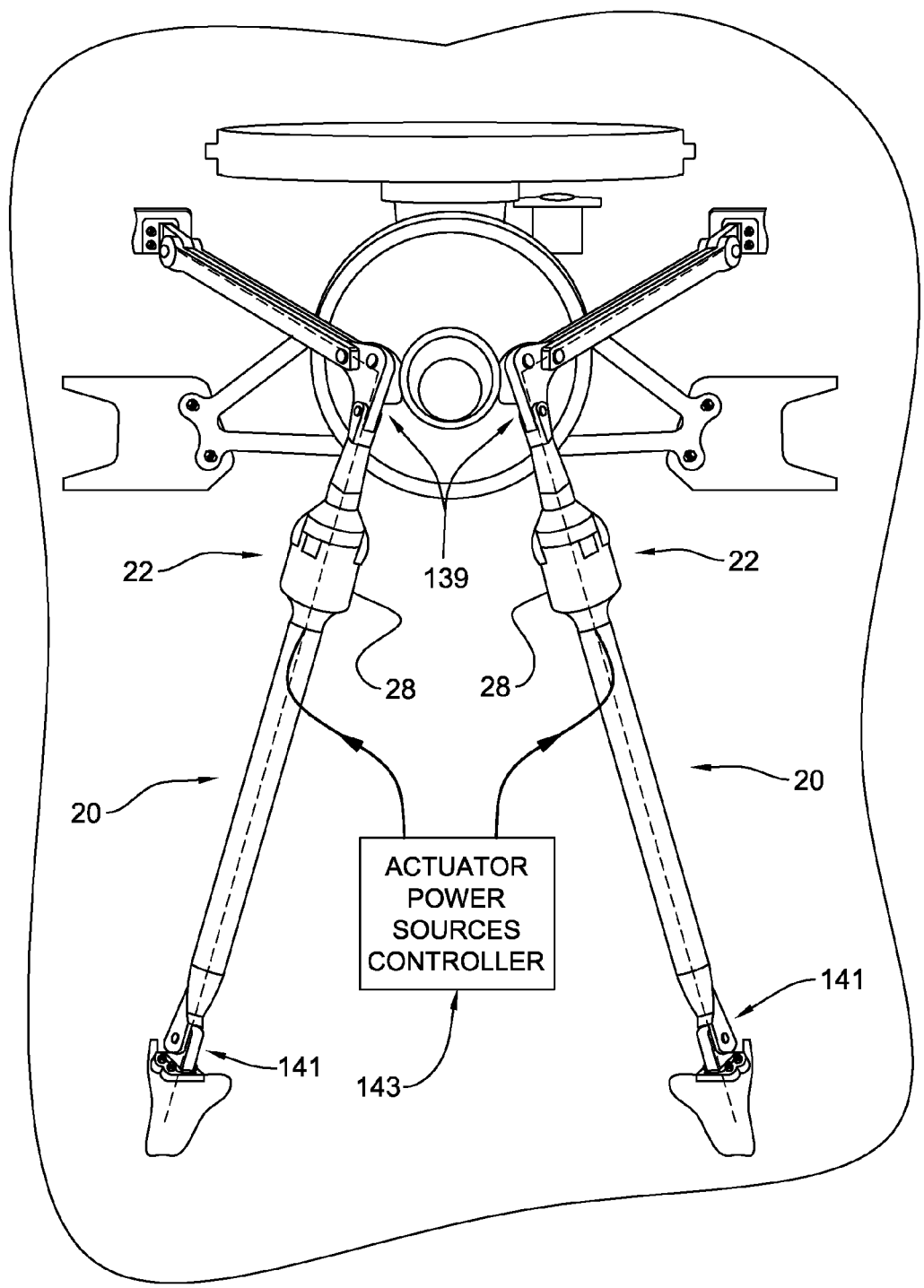
Figure 6G:
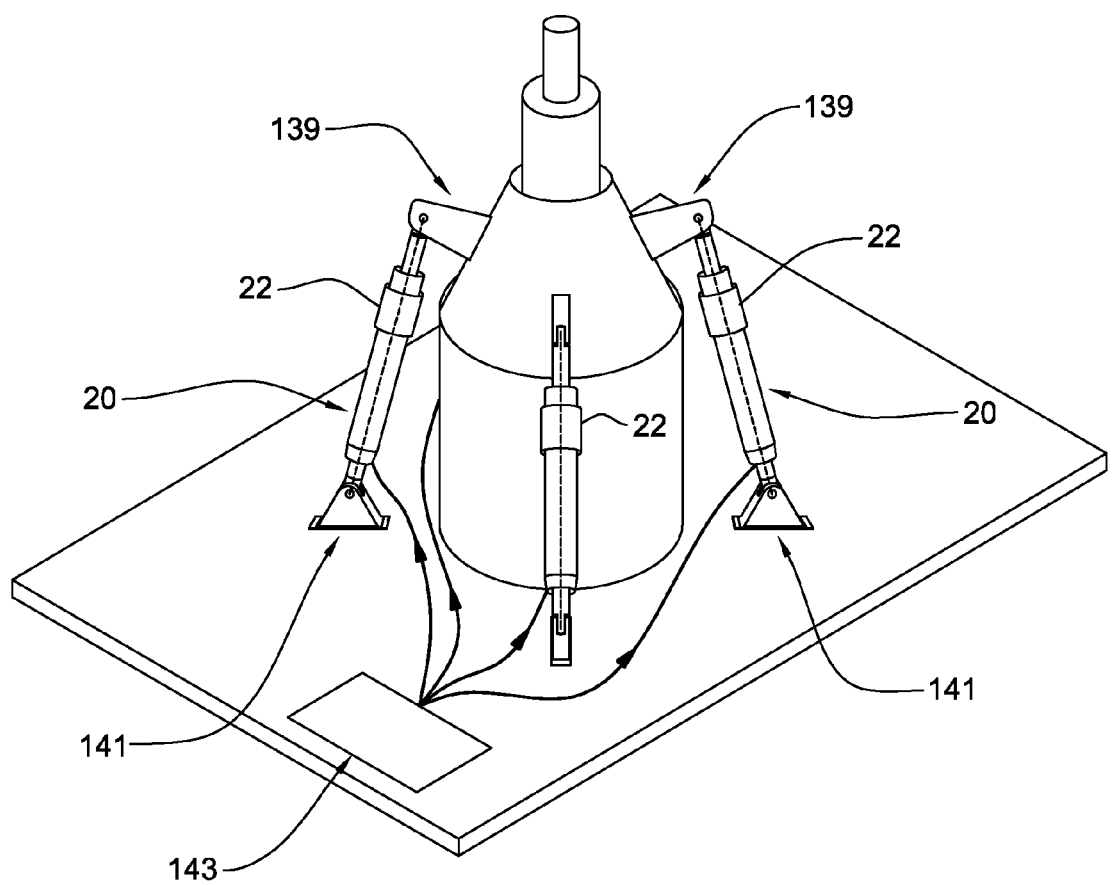

Preferably Ap/At≧5, more preferably Ap/At≧8, Ap/At≧10. Preferably making the isolator 22 includes providing the first outer tubular spring elastomer 40 with the elastomer bonded to and between the housing inner rigid surface 42 and the inner rigid member outer rigid surface 44, preferably with the bonded assembly swaged to reduce the outer rigid member diameter and compress the elastomer prior to installing in the isolator 22. Preferably making the isolator includes providing the second inner end tubular elastomer 46, with the tubular elastomer 46 disposed in the inner rigid member 32 proximate the second strut end 26, the second inner end tubular elastomer 46 bonded to a second inner rigid surface of an inner rigid member cavity received tubular member, the second inner tubular elastomer 46 bonded to a second outer rigid surface 50 of the inner rigid member actuator plunger outer diameter surface, and the second inner end tubular elastomer 46 having an second outer diameter OD2, with preferably with the elastomer bonded to inner and outer rigid member assembly swaged to reduce the outer rigid member surface diameter and compress the elastomer prior to installing in the isolator 22. Preferably making the isolator includes providing an inner rigid member inertial liquid track 34, preferably having the cross-sectional area (At). As shown in FIG. 5A-F, providing inner rigid member inertial liquid track 34 preferably includes providing a helical track core modular insert 76 that is received by a track core receiver 78 of the inner rigid member 32. Preferably the helical track core modular insert 76 is rotatably positionable within the track core receiver 78 for fine tuning of the track path to provide fine tuning of the frequency isolation notch band and the center notch frequency. Preferably the invention provides for rotating of the relative rotational orientation of the helical track core modular insert 76 relative to the track core receiver 78 and its fluid flow mouth 80 to tune the isolator. As shown in FIG. 5A-F, the helical track core modular insert 76 includes a plurality of track core tuning adjustment holes 84, to provide a plurality of rotational positions of the insert 76 relative to the track core receiver 78 and its fluid flow mouth 80. Preferably the inner rigid member 32 and its track core receiver 78 includes an orientation fixture 82, such as a track core fixturing pin protrusion 82 that is received by one of the four track core tuning adjustment holes 84. Additionally the invention provides further relative gross tunability with helical track core modular inserts 76 with different inertial track paths 34 such as shown by FIG. 5B-D, that are receivable in the track core receiver 78. As shown in the helical track core modular inserts 76 are rotatable relative to the track core receiver mouth 80, such that the overlay of the mouth 80 and the inertial track entrance 38 provides fine adjustment of the inertial path track between the two variable volume pumping chambers 62 and 64. Preferably the isolator 22 is provided with a variable volume compensator chamber 70 with a compensator spring 72, with the compensator chamber in fluid communication with the pumping chambers through a relatively small cross sectional area liquid conduit 86, with its cross section area relatively small compared with the inertial track cross section At.

In an embodiment the invention includes a strut isolator 22. The strut isolator 22 includes first strut end member 24 and second strut end member 26, the second strut end 26 distal from the first strut end 24. The first strut end member 24 includes outer rigid nonelastomer housing 28, the outer rigid housing 28 defining inner cavity 30. The second strut end member 26 includes inner rigid nonelastomer member 32, the inner rigid member 32 extending into and inside the outer rigid housing inner cavity 30. The inner rigid member 32 includes inertial fluid track 34 extending in the direction from the first strut end 24 towards the second strut end 26, the inertial fluid track 34 having a first entrance end 36 proximate the first strut end and a second entrance end 38 proximate the second strut end. Preferably the inertial fluid track 34 is a circuitous circular nondirect helical wrapped fluid conduit track.

The strut 20 and isolator 22 preferably includes at least first outer tubular spring elastomer 40 disposed between the outer rigid housing 28 and the inner rigid member 32. Preferably the at least first outer tubular elastomer 40 is comprised of a longitudinal cylindrical shell, preferably with a longitudinal length greater than its diameter. The first outer tubular spring elastomer 40 is bonded to a first inner rigid surface 42 of the outer rigid housing 28, preferably with at least one of the rigid surfaces being on a rigid tubular insert intermediate member, the first outer tubular spring elastomer 40 bonded to first outer rigid surface 44 of the inner rigid member 32, with the first outer tubular spring elastomer 40 having inner diameter ID1, outer diameter OD1 and middle diameter (D1mo).

In preferred embodiments strut isolator 22 includes second inner tubular elastomer 46, the second inner end tubular elastomer 46 disposed inside the inner rigid member 32 proximate the second strut end 26. Preferably the second inner end tubular elastomer 46 is comprised of a longitudinal cylindrical shell, preferably with a longitudinal length. The second inner end tubular elastomer 46 is bonded and has a second outer diameter OD2, second inside diameter ID2, and middle diameter (D2mi) of the inner end tubular elastomer.

The strut isolator 22 preferably includes fluid 60, most preferably an isolator fluid comprised of an inertial tuning nonsolid mass liquid.

Preferably the second strut end member 26 includes a rigid structural extension extending from outside the exterior of the isolator and housing 28, into the inner cavity 30 through an end opening to provide structural attachments at each end of the strut, preferably with a direct load path through the isolator structural members to support the axial loads, preferably through the outer tubular elastomer spring 40, 40', 40". Preferably the strut provides the structural support stiffness of at least 3,000 lbs/inch static spring stiffness, more preferably the at least 13,000 lbs/inch spring stiffness, more preferably the at least 23,000 lbs/inch spring stiffness, more preferably the at least 35,500 lbs/inch spring stiffness, most preferably the at least 45,000 lbs/inch spring stiffness, with this high static stiffness providing for structural support while controlling motion and minimizing transmission of troublesome vibrations between its two ends. Preferably the strut isolator 22 provides a frequency notch band, preferably a frequency notch band in the range from about 10 Hz to 40 Hz. In a preferred alternative embodiment the strut isolator 22 provides a frequency notch band in the range from about 50 Hz to 500 Hz. Preferably the strut isolator 22 provides a frequency notch band centered about a center frequency, and having a notch band width of at least 10% of the center frequency. Preferably the strut isolator has a notch band depth providing at least a 50% reduction of the static spring stiffness, preferably a stiffness reduction of at least 50% of the at least 3,000 lbs/inch static spring stiffness, preferably a stiffness reduction of at least 50% of the at least 13,000 lbs/inch static spring stiffness, preferably a stiffness reduction of at least 50% of the at least 23,000 lbs/inch static spring stiffness, preferably a stiffness reduction of at least 50% of the at least 35,500 lbs/inch static spring stiffness, and preferably a stiffness reduction of at least 50% of the at least 45,000 lbs/inch static spring stiffness.

Preferably the strut isolator 22 includes a variable volume compensator chamber 70. Preferably the variable volume compensator chamber 70 includes compensator spring 72, spring loaded compensator piston 74, and compensator diaphragm 176. In an embodiment the compensator spring is a gas spring. In an embodiment the compensator spring is an elastomer spring. In an embodiment the compensator spring is a coil spring. Preferably the spring loaded compensator piston 74 and the compensator diaphragm 176 allow for thermal expansion and contraction of the fluid due to temperature changes while minimizing the pressure change in the isolator, preferably with pressure changes less than 15%, preferably the variable volume compensator nonpumping and dynamically isolated from the pumping chambers 62, 64 and the track 34. Preferably the volume compensator chamber 70 is proximate the first variable volume chamber, and in fluid communication with the variable volume pumping chamber through a relatively small cross-section area conduit 86, compared to the cross-section area At of the track conduit 34. Preferably the compensator spring 72, the spring loaded compensator piston 74, the compensator diaphragm 176, and the compensator chamber 70 are dynamically isolated with the volume of the compensator 70 inhibited from changing by the movements 100, 101, but relatively slowly changing over extended period of time due to temperature based volume changes of the liquid 60. Preferably the variable volume compensator chamber includes the spring loaded compensator piston 74.

Preferably the invention includes longitudinal strut isolator 22, the longitudinal strut isolator having an exterior and a longitudinally extending axis 21. Isolator 22 includes the first strut end member 24 and second strut end member 26, the second strut end 26 opposite and longitudinally distal from the first strut end 24 along its longitudinally extending axis 21. The first strut end member 24 includes the outer rigid nonelastomer longitudinally extending housing 28, the outer rigid longitudinally extending housing 28 extending longitudinally towards the second strut end member 26. The outer rigid longitudinally extending housing 28 defines the interior inner cavity 30, with the interior cavity 30 containing the first variable volume fluid pumping chamber 62 proximate the first strut end and the distal second variable volume fluid pumping chamber 64 distal and opposite end from the first chamber 62 proximate the second strut end. The second strut end member 26 includes the rigid structural extension 27 longitudinally extending from the isolator exterior into the interior inner cavity 30. The inner rigid nonelastomer member includes the rigid structural extension. The inner rigid member includes the inertial fluid track 34. Preferably the track is a circuitous circular nondirect helical wrapped liquid conduit track, preferably with the inner rigid the helical track core insert member 76 having the outer perimeter track groove with the cross section area At, preferably with a smooth curved cross section profile, with the inner core insert member 76 received inside the inner core member receiving housing track core receiver 78. The track 34 extends in the direction from the first strut end towards the second strut end, the inertial fluid track 34 having the first entrance end 36 in fluid communication with the first variable volume chamber proximate the first strut end and the second entrance end 38 in fluid communication with the second variable volume chamber proximate the second strut end.

The at least first outer longitudinal cylindrical shell tubular elastomer spring 40, 40', 40" preferably has a longitudinal length greater than its diameter. The at least first outer longitudinal spring elastomer 40, 40', 40" is disposed between the outer rigid housing and the inner rigid member. Preferably the at least first outer tubular elastomer 40, 40', 40" is bonded to the first inner rigid surface 42 of the outer rigid housing, and bonded to the first outer rigid surface 44 of the inner rigid member. The first outer tubular spring elastomer having the inner diameter ID1, outer diameter OD1 and middle diameter (Dmo).

Preferably the isolator 22 includes the inertial tuning nonsolid mass liquid isolator fluid 60. The movement of the first strut end member in the first strut longitudinal direction plungers and pumps the liquid 60 from one variable volume chamber into the track 34 towards the opposite variable volume chamber, and the opposite movement of the first strut end member in the second longitudinal direction along the axis 21 plungers and pumps the liquid from the opposite variable volume chamber through the track towards the one other variable volume chamber. The second strut end member includes the rigid structural extension extending from outside the exterior of the isolator housing, into the inner cavity 30 with the acting isolator strut having the frequency notch band and providing structural attachments at each end of isolator with the direct load path through the isolator structural members and spring 40 to support the axial loads, preferably with the static spring stiffness of at least 3,000 lbs/inch static spring stiffness. More preferably the static spring stiffness is greater than 13,000 lbs/inch, more preferably greater than 23,000 lbs/inch, more preferably greater than 35,500 lbs/inch, and most preferably at least 45,000 lbs/inch. The isolator preferably minimizes the relative motion between the two ends while supporting the axial load and isolating the tuned frequency motion between the first and second strut ends in the tuned frequency isolation notch band. In a preferred embodiment the frequency notch band is in the range from about 10 Hz to 40 Hz. In a preferred alternative embodiment the frequency notch band in the range from about 50 Hz to 500 Hz. Preferably the frequency notch band is centered about the center frequency, with the band having the notch band width of at least 10% of the center frequency. Preferably the isolator has the notch band depth providing at least the 50% reduction of the static spring stiffness.

Preferably the isolator includes the variable volume compensator chamber 70, preferably with the spring 72. The spring loaded compensator piston 74, and the compensator diaphragm 176, allowing for thermal expansion and contraction of the fluid while minimizing the pressure change in the isolator. Preferably the variable volume compensator is nonpumping and dynamically isolated. Preferably the variable volume compensator is proximate the second variable volume chamber, and in fluid communication with the pumping chamber through the relatively small cross-section area conduit 86, compared to cross-section area Ta of the track conduit 34. Preferably the variable volume compensator chamber includes the spring loaded compensator piston 74.

In an embodiment the invention includes the support isolator 22. The isolator having an exterior and the longitudinally extending axis 21. The isolator 22 having the first end member 24 and the second end member 26, the second end 26 opposite from the first end 24 along the longitudinally extending axis 21. The isolator 22 includes the isolator fluid 60. The first end member 24 includes the outer rigid longitudinally extending housing 28, the outer rigid longitudinally extending housing 28 extending longitudinally towards the second end member 26, with the outer rigid longitudinally extending housing 28 defining the interior cavity 30. Preferably the interior cavity 30 contains the first variable volume fluid chamber 62 proximate the first end and the distal second variable volume fluid chamber 64 proximate the second end. The second end member includes the rigid structural extension 27 longitudinally extending from the isolator exterior into the interior cavity 30. The rigid structural extension inner rigid member preferably includes the inertial fluid track 34 extending in the direction from the first end towards the second end, the inertial fluid track having the first entrance end in fluid communication with the first variable volume chamber and the second entrance end in fluid communication with the second variable volume chamber. The outer tubular spring 40, 40', 40" between the inner rigid member 32 and the outer rigid housing 28 preferably provide a high static spring stiffness of at least 3,000 lbs/inch. Preferably the movement of the first end member in the first longitudinal direction along the axis plungers the fluid in the track 34, and the opposite movement of the first end member in the second longitudinal direction plungers the fluid in the opposite direction. Preferably the outer tubular spring 40, 40', 40" between the inner rigid member 32 and the outer rigid housing 28 provide a supporting static spring stiffness greater than 13,000 lbs/inch, more preferably greater than 23,000 lbs/inch, more preferably greater than 35,500 lbs/inch, and most preferably at least 45,000 lbs/inch.

In an embodiment the invention includes an aircraft suspension system for isolating an aircraft power unit. As shown in FIG. 6D-G, the aircraft suspension system preferably includes the support struts 20 with the strut isolators 22. Preferably the aircraft power unit has at least one aircraft power unit operation frequency and includes at least one longitudinal suspension isolator support strut 20 with the strut isolator 22. Preferably the aircraft motive power unit suspension system has a plurality of longitudinal suspension isolator support struts 20. Preferably the aircraft power unit suspension system 120 is a focalized system. In an embodiment the aircraft power unit suspension system is partially focalized. In an embodiment the aircraft power unit suspension system is a fully focalized system. Preferably the aircraft power unit suspension system 120 isolates an aircraft power unit with a first operation frequency. The aircraft power unit suspension system 120 includes the longitudinal suspension isolator support struts 20. As shown in FIG. 6D-G, the aircraft power unit suspension system 120 includes longitudinal suspension isolator support struts 20 with the strut isolator 22. The aircraft power unit suspension system 120 includes the at least one longitudinal fluid isolated suspension support strut 20. Preferably the strut includes the tuned isolator fluid inertial track path 34 having the tuned frequency isolation notch band, with the frequency notch band centered about the center frequency, and having the notch band width, with the notch band width encompassing the at least one power unit operation frequency. As shown in FIG. 6D-G the plurality of struts 20 are preferably attached to the power unit 122 with attachment brackets 154, preferably with a clevis member 156 with devises 162.

Figure 8C:
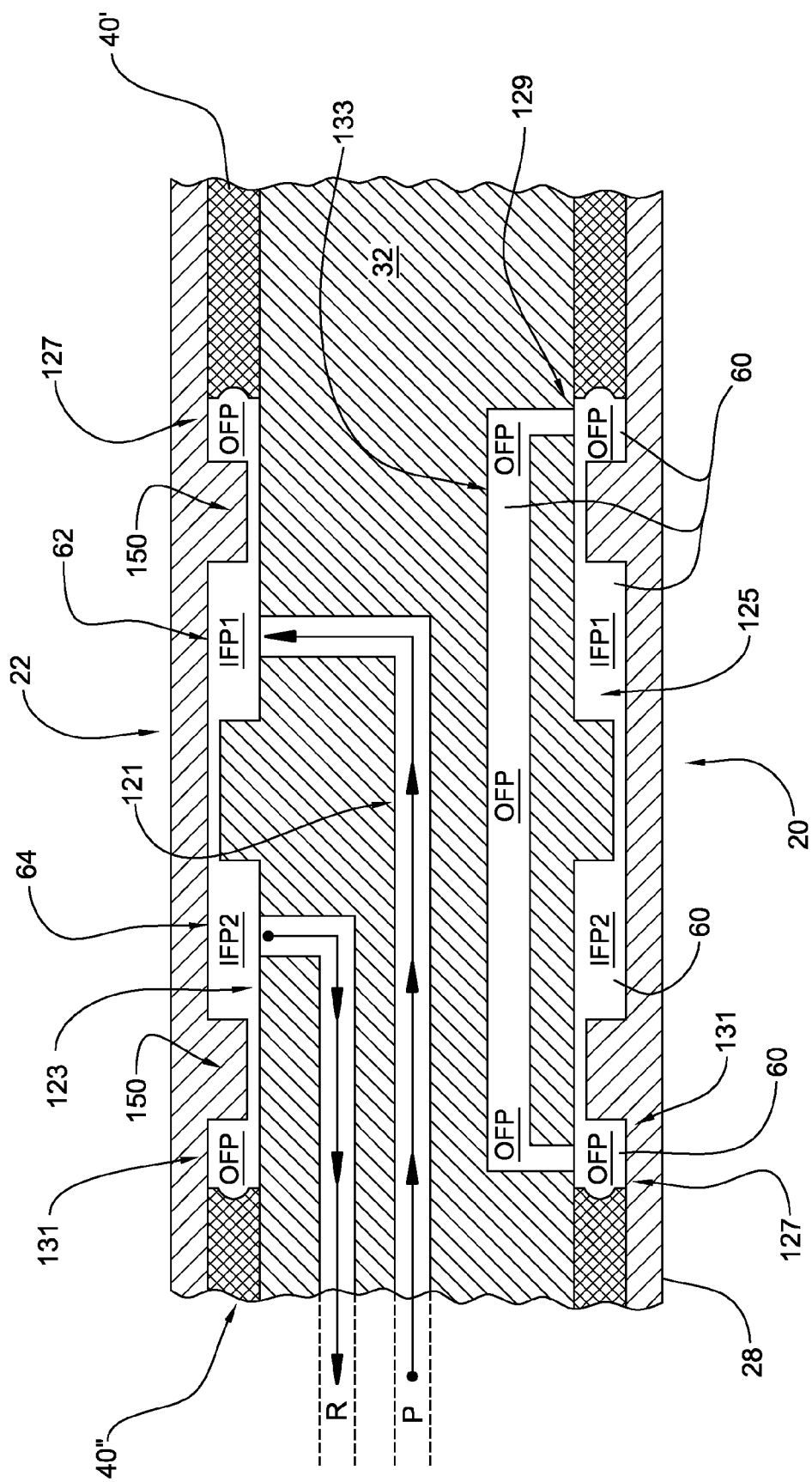

In an embodiment the invention includes an aircraft suspension system for isolating an aircraft power unit. As shown in FIG. 6D-G the aircraft suspension system preferably includes at least one support strut 20. As shown in FIG. 6D-G, the aircraft suspension system preferably is an aircraft motive power unit suspension system 200 for isolating the aircraft motive power unit having the at least one aircraft motive power unit rotary wing operation frequency. The aircraft power unit suspension system 200 includes at least one longitudinal fluid isolated suspension strut 20. In preferred embodiments the isolated suspension strut 20 includes the strut isolator 22 having a tuned isolator fluid inertial track path 34 with a tuned frequency isolation notch band, with the tuned frequency isolation notch band centered about a center notch frequency, and having a notch band width, with the notch band width encompassing the at least one aircraft motive power unit operation frequency. In preferred embodiments the aircraft power unit suspension system 200 includes at least one longitudinal fluid isolated suspension strut 20, such as shown in FIG. 8. Preferably with struts 20 as shown in FIG. 8, the first variable volume chamber 62 and the second variable volume chamber 64 are inner fluid chambers within an outer fluid-elatomeric chamber defined by the outer rigid housing 28, inner rigid member 32, and the at least first and second bonded elastomers 40', 40". Preferably the struts 20 of FIG. 8 are used in suspension systems 200 as active struts applying a force when powered by applied hydraulic power from a servovalve to provide active force control to the suspension system.

In preferred embodiments the isolator 22 uses the inertial force of the fluid 60 to cancel vibrations between the two ends 24 and 26 at specific tuned vibration frequencies, with the track 34 preferably tuned to a troublesome operation center frequency that is preferably isolated while the strut 20 supports an axial load along its axis 21. The isolator is preferably single acting and provides structural attachment at each end of the isolator 22 with direct load paths through the outer tubular elastomer spring 40 and the first strut end 24 and the second strut end 26, that provides a high spring stiffness in series with isolation. The inertial forces of the liquid 60 oscillating in the track 34 cancel vibrations at the specifically tuned frequency of operation of operating vibrating equipment units.

The powered active vibration control system preferably utilizes the actuator plunger to provide a maximum output force at the vibration controlling frequency, preferably at the blade passage frequency (N/rev) in a helicopter.

Preferably the powered active vibration control system strut and isolator houses at least a first cylindrical elastomeric spring tubeform that provides for a relative motion, a static load support, and a hermetic fluid chamber seal for containing a fluid. Preferably an inertia track, preferably helical, connects the first fluid chamber with a second fluid chamber allowing fluid to flow between them. The length and diameter cross section area of the inertia track is preferably selected to provide the tuned frequency. The second fluid chamber is preferably sealed by a smaller cylindrical elastomeric spring tubeform that accommodates the volume of the displaced fluid by flexing, and provides a second hermetic fluid seal for containing the fluid, and also acts as a secondary spring in the system.

Preferably a third volume compensator fluid chamber is connected to either or both of the fluid chambers by means of an orifice that has a much smaller diameter than the inertia track. This chamber is pressurized by means of a spring, preferably a mechanical or gas spring (most preferably by both) to apply a static pressure on the fluid. The spring is relatively low stiffness to accommodate changes in the fluid volume due to thermal expansion without creating large changes in the fluid pressure. The restriction of the small orifice prevents flow under dynamic conditions.

A plunger actuator that applies external force from an external supplied power source is attached to a member of the strut isolator. Preferably the force actuator 111 is preferably chosen from the plunger actuator group consisting of a piezo-electric force actuator, piezo-ceramic force actuator, shape memory alloy force actuator, electromagnetic force actuator 115 or hydraulic force actuator 113. Preferably the powered active vibration control system isolator has a working pressure for the fluid, preferably in the range of about 100 to 1000 p.s.i. in working operation. Preferably under dynamic working conditions the actuator force is amplified by the resonant response of the inertia of the fluid and the elasticity of the fluid chambers, preferably with a maximum response at a desired frequency to maximize the ratio of the output force to the input force.

Preferably the powered active vibration control system is used as a supporting strut 2-point actuator by applying the force between two attaching points, preferably between the transmission of the helicopter and the airframe. Preferably they are utilized as longitudinal struts, or in an alternative embodiment as compact isolator units for pad or foot mounted transmissions. In an alternative embodiment they are used as single point inertial actuator by attaching one end to structure and an appropriate mass to the other end so they function like an active TVA.

Figure 7A:
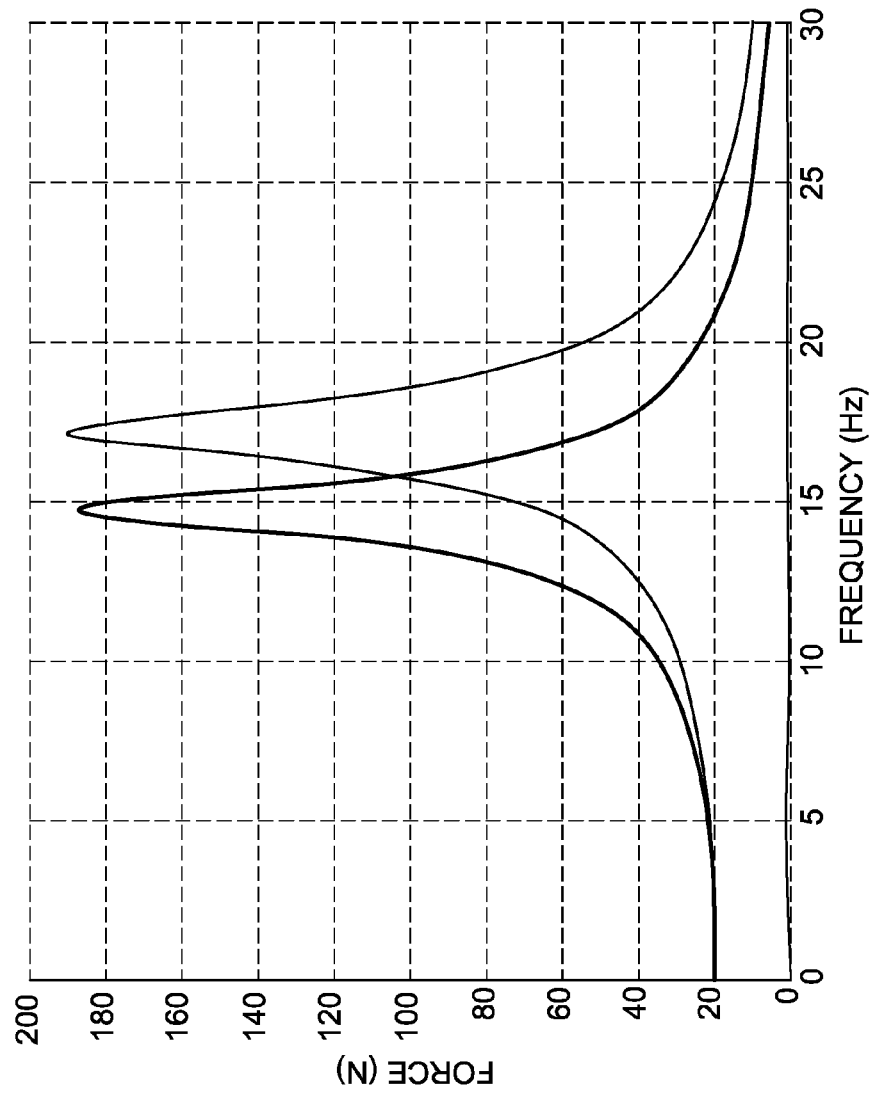
FIG. 7A shows a plot of Force output (N) versus Frequency (Hz) for two different tuned frequencies (center frequency for the N/rev vibration control tuned by two different inertia track core insert members with different track dimensions).
Figure 7B:
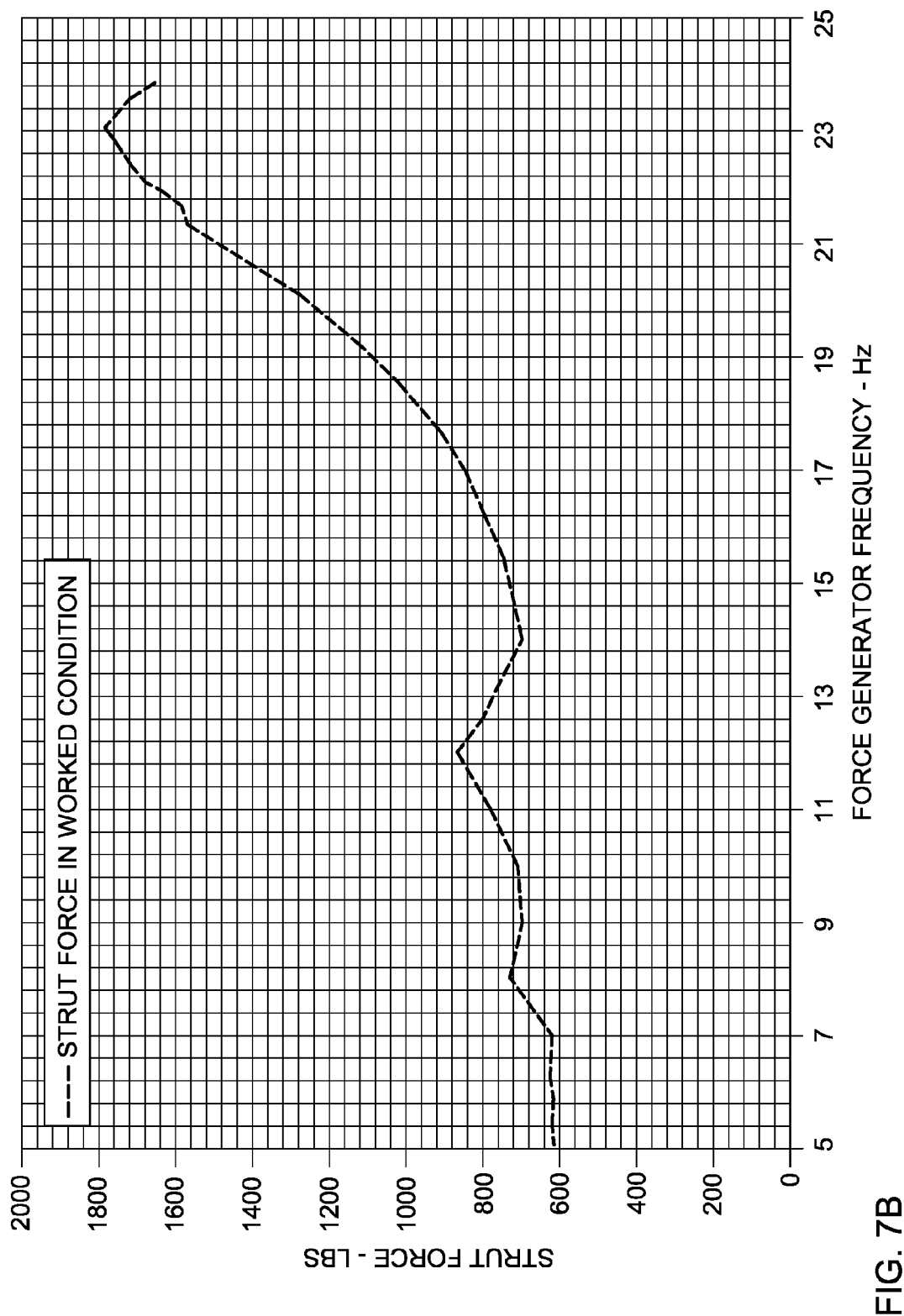
FIG. 7B shows a plot of Strut Force (lbs) versus Force Generator Frequency (Hz).
Figure 7C:
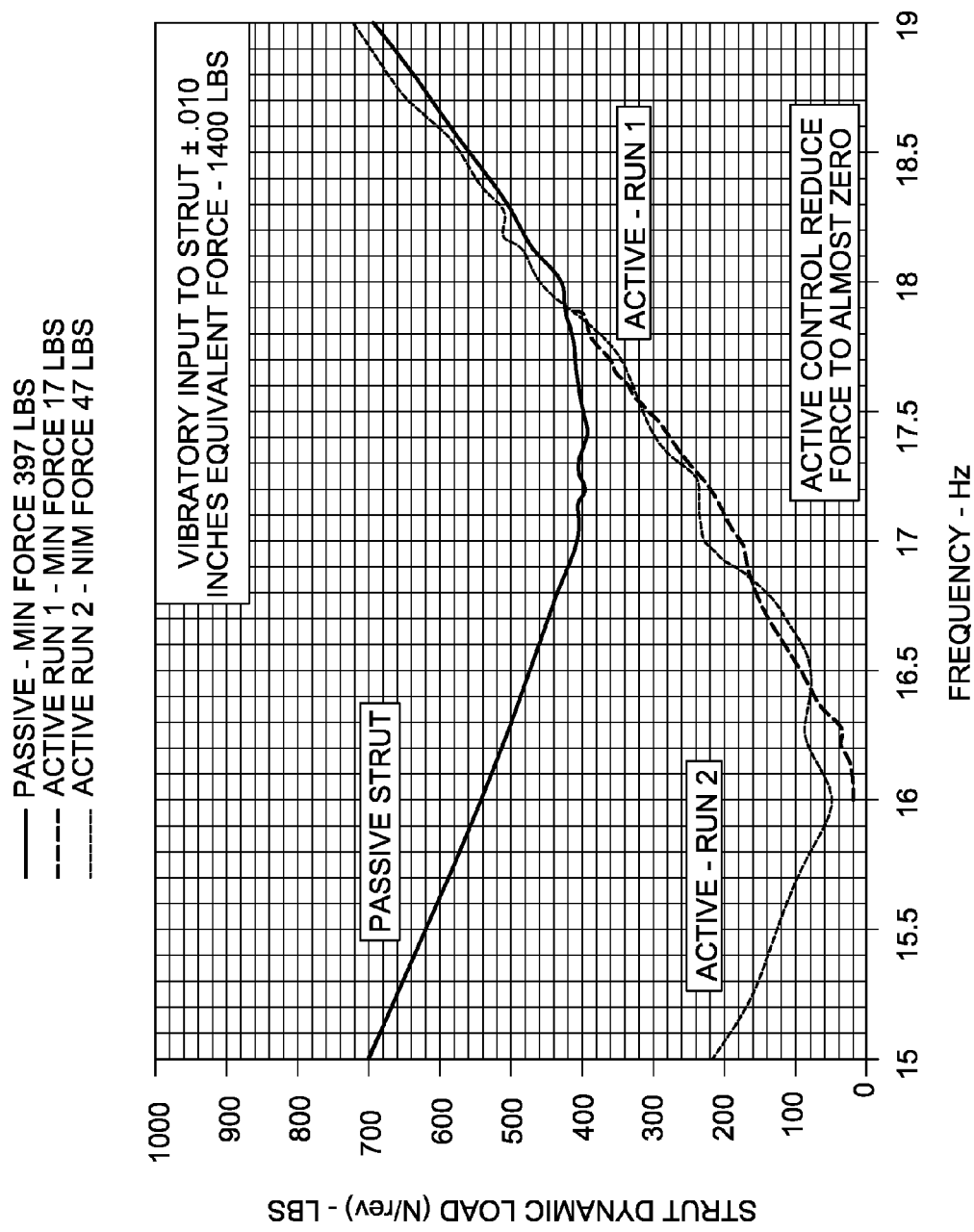
FIG. 7C shows a plot of Strut Dynamic Load (N/rev)-lbs versus Frequency (Hz) comparing a passive strut run and two active controlled powered strut runs with the active powered controlled struts reducing minimum force almost to zero (17 and 47 lbs min. force compared unpowered passive 397 lbs min. force)

FIG. 7A shows a curve showing the magnitude of the output force from the isolator relative to the magnitude of the input force as a function of frequency. It can be seen that there is a significant peak in the magnitude of the force at a specific frequency.

In an embodiment the invention includes an aircraft suspension system. The aircraft suspension system includes at least one vibration controlling suspension support strut. The vibration controlling suspension support strut includes a first strut end with an outer rigid housing, the outer rigid housing at least a first outer bonded tubular elastomer, a first variable volume fluid chamber, a second variable volume fluid chamber, and a fluid conduit between the first variable volume fluid chamber and the second variable volume fluid chamber. The vibration controlling suspension support strut includes a second strut end with an inner rigid member, the second strut end distal from the first strut end, the second strut end extending into the first strut end outer rigid housing with the at least first outer bonded tubular elastomer bonded between the first strut end and the second strut end wherein an applied hydraulic power generates a vibration controlling strut force between the first strut end and the second strut end. In embodiments the strut includes a hydraulic actuator plunger 54 adjacent the second variable volume fluid chamber 64 wherein the applied hydraulic power applied to the hydraulic actuator 113 contracts and expands the second variable volume fluid chamber 64. In embodiments the strut includes a second outer bonded tubular elastomer, the second outer bonded tubular elastomer bonded between the first strut end and the second strut end. Preferred embodiment of strut 20 are shown in FIG. 8, with struts 20 including the at least first outer bonded tubular elastomer 40' and the second outer bonded tubular elastomer 40", with the outer bonded tubular elastomers bonded between the first strut end and the second strut end. Preferably the first outer bonded tubular elastomer 40' and the second outer bonded tubular elastomer 40" are distal from the first variable volume fluid chamber 62 and the second variable volume fluid chamber 64. Preferably the strut includes a first chamber hydraulic fluid delivery conduit 121 for delivering hydraulic fluid to the first variable volume fluid chamber 62 and a second chamber hydraulic fluid delivery conduit 123 for delivering hydraulic fluid to the second variable volume fluid chamber 64, and a inner rigid member hydraulic fluid moved plunger piston 125 between the first variable volume fluid chamber and the second variable volume fluid chamber. Preferably the outer rigid housing, the inner rigid member, the first outer bonded tubular elastomer and the second outer bonded tubular elastomer define an external fluid-elastomeric chamber 127 operable for containing the hydraulic fluid 60, with the first variable volume fluid chamber 62, the second variable volume fluid chamber 64, and the inner rigid member hydraulic fluid moved piston 125 internal to and submerged within the external fluid-elastomeric chamber 127. Preferably the first variable volume fluid chamber 62 and the second variable volume fluid chamber 64 are in fluid communication with the surrounding external fluid-elastomeric chamber 127 with the first variable volume fluid chamber and the second variable volume fluid chamber separated from the surrounding external fluid-elastomeric chamber, with the fluid in the external fluid-elastomeric chamber outside the first variable volume fluid chamber and the second variable volume fluid chamber dynamically isolated from the internal chambers 62 and 64 and preferably having an operational outside ambient fluid pressure OFP. Preferably the external fluid-elastomeric chamber 127 has a first chamber end 129 adjacent the first outer bonded tubular elastomer 40' and a second chamber end 131 adjacent the second outer bonded tubular elastomer 40", with an operational outside ambient OFP pressure fluid transfer conduit 133 connecting the first chamber end 129 and the second chamber end 131. The support strut creates dynamic forces by modulating the pressures in the first variable volume fluid chamber 62 and the second variable volume fluid chamber 64 about a nominal pressure (IFP1=Pnom+dP1, IFP2=Pnom+dP2. Note IFP1 does not equal IFP2). The created dynamic force is approximately equal to the pressure differential times the piston 125 area:

$$F\text{dyn}=\text{Area}*(IFP1-IFP2)=\text{Area}*(dP1-dP2)$$

The fluid communication between the variable volume fluid internal chambers 62 and 64 and the external fluid-elastomeric chamber 127 is preferably a dynamically isolating relative long and thin orifice with a relatively small cross-section area and relatively small orifice volume such that the external fluid-elastomeric chamber 127 is substantially dynamically isolated from the dynamic pressures (OFP~Pnom) supplied from the hydraulic pressure source P and the low pressure hydraulic reservoir R through the pressure differential delivery conduits 121, 123, preferably with OFP proximate to Pnom. Preferably the system/method includes maintaining the fluid in the fluid-elastomeric chamber ends 129 and 131 adjacent to the elastomer sections 40' and 40" near and proximate the nominal pressure (Pnom) and isolating the fluid there from the modulated dynamic pressure fluctuations in variable volume fluid internal chambers 62 and 64, preferably with dynamically isolating conduits 150 inhibiting OFP pressure from changing with the modulated pressure differentials dP1 and dP2. Preferably the dynamic isolator separators 128 and 130 protrude from the outer housing 28 inward towards the inner rigid member 32 and define dynamically isolated conduits 150. Preferably the dynamic isolator separators 128 and 130 define dynamically isolated conduits 150 with fluid communication dimensions which isolate the chamber ends 129 and 131 from the modulated dynamic pressure fluctuations. Preferably the dimensions of isolator separators 128 and 130 and the isolated conduits 150 are sized long and thin. Preferably the isolated conduits 150 are relatively small and provide a constricted fluid communication with constricted fluid flow, preferably with the axial longitudinally extending length of dynamic isolator separators 128 and 130 relatively long, and the dynamically isolated conduit gap thickness between the outer housing 28 and the inner rigid member 32 relatively thin. Preferably the length of conduits 150 is relatively long. Preferably the gap thickness of conduits 150 is relatively thin.

In an embodiment the invention includes a method of upgrading a helicopter. The method includes providing a helicopter 135 having a first support strut member 137 for supporting an axial load between a first strut helicopter attachment 139 and a second strut helicopter attachment 141. The method includes detaching the first support strut member 137 from the first strut helicopter attachment 139 and the second strut helicopter attachment 141. The method includes providing an upgrade support strut 20 for supporting the axial load, the upgrade support strut 20 including a strut isolator 22, the strut isolator having a first strut end member 24 and a second strut end member 26, the second strut end distal from the first strut end. The first strut end member 24 includes outer rigid housing 28, the outer rigid housing defining inner cavity 30. The second strut end member 26 includes inner rigid member 32, with inner rigid member 32 extending into the outer rigid housing inner cavity 30. The strut includes an at least first outer tubular elastomer 40, 40', 40" disposed between the outer rigid housing and the inner rigid member. The first outer tubular elastomer 40, 40', 40" is bonded to a first inner rigid surface of the outer rigid housing and to a first outer rigid surface of the inner rigid member. The strut includes the fluid 60 with the outer rigid housing and the inner rigid member providing a first variable volume fluid chamber 62 proximate the first strut end and a second variable volume fluid chamber 64 proximate the second strut end. The method includes connecting a control power input 143 to the upgrade support strut 20, and attaching the upgrade support strut 20 to the first strut helicopter attachment 139 and the second strut helicopter attachment 141, and inputting power into the strut isolator to control a vibration. Preferably the provided upgrade support strut isolator includes the second outer bonded tubular elastomer 40" with the second outer bonded tubular elastomer bonded between the outer rigid housing and the inner rigid member in addition to the first elastomer 40', preferably with the first outer bonded tubular elastomer 40' and the second outer bonded tubular elastomer 40" distal from the first variable volume fluid chamber 62 and the second variable volume fluid chamber 64. Preferably the provided upgrade support strut isolator includes first chamber hydraulic fluid delivery conduit 121 for delivering hydraulic fluid to the first variable volume fluid chamber 62 and second chamber hydraulic fluid delivery conduit 123 for delivering hydraulic fluid to the second variable volume fluid chamber 64, with inner rigid member hydraulic fluid moved piston 125 between the first variable volume fluid chamber 62 and the second variable volume fluid chamber 64. Preferably the outer rigid housing, the inner rigid member, the first outer bonded tubular elastomer and the second outer bonded tubular elastomer define external fluid-elastomeric chamber 127 operable for containing the hydraulic fluid 60, with the first variable volume fluid chamber, the second variable volume fluid chamber, and the inner rigid member hydraulic fluid moved piston internal to and submerged within the external fluid-elastomeric chamber 127. Preferably the first variable volume fluid chamber 62 and the second variable volume fluid chamber 64 are in fluid communication with the surrounding external fluid-elastomeric chamber 127 with the first variable volume fluid chamber and the second variable volume fluid chamber separated from the surrounding external fluid-elastomeric chamber, with the fluid in the external fluid-elastomeric chamber outside the first variable volume fluid chamber and the second variable volume fluid chamber having an operational outside ambient fluid pressure OFP. Preferably the first variable volume fluid chamber 62 and the second variable volume fluid chamber 64 are separated from the surrounding external fluid-elastomeric chamber, with the fluid in the external fluid-elastomeric chamber 127 outside the first variable volume fluid chamber and the second variable volume fluid chamber dynamically isolated from the internal chambers 62 and 64 and preferably having the dynamically isolated operational outside ambient fluid pressure OFP. Preferably the external fluid-elastomeric chamber 127 has the first chamber end 129 adjacent the first outer bonded tubular elastomer 40' and the second chamber end 131 adjacent the second outer bonded tubular elastomer 40", with the operational outside ambient OFP pressure fluid transfer conduit 133 connecting the first chamber end 129 and the second chamber end 131. The support strut creates dynamic forces and controls motion with controlled modulating of the pressures in the first variable volume fluid chamber 62 and the second variable volume fluid chamber 64 about the nominal pressure (IFP1=Pnom+dP1, IFP2=Pnom+dP2). The controlled dynamic force is created with the pressure differential applied to the piston 125. The fluid communication conduits between the internal chambers 62 and 64 and the external fluid-elastomeric chamber 127 are preferably dynamically isolating relatively long and thin conduits with the relatively small cross-section area and relatively long lengths such that the external fluid-elastomeric chamber 127 is substantially dynamically isolated from the dynamic pressures (OFP~Pnom) supplied from the hydraulic pressure source P and the low pressure hydraulic reservoir R through the pressure differential delivery conduits 121, 123. Preferably the system/method includes maintaining the fluid in the fluid-elastomeric chamber ends 129 and 131 adjacent to the elastomer sections 40' and 40" near and proximate the nominal pressure (Pnom) and isolating the fluid there from the modulated dynamic pressure fluctuations in internal chambers 62 and 64, preferably with dynamically isolating conduits 150 inhibiting OFP pressure from changing with the modulated pressure differentials dP1 and dP2. Preferably the dynamic isolator separators 128 and 130 protrude from the outer housing 28 inward towards the inner rigid member 32 and define dynamically isolated conduits 150. Preferably the dynamic isolator separators 128 and 130 define dynamically isolated conduits 150 with fluid communication dimensions which isolate the chamber ends 129 and 131 from the modulated dynamic pressure fluctuations in the internal chambers 62 and 64. Preferably the dimensions of isolator separators 128 and 130 and the isolated conduits 150 are sized long and thin for dynamic isolation. Preferably the isolated conduits 150 are relatively small and provide a constricted fluid communication with constricted fluid flow, preferably with the axial longitudinally extending length of dynamic isolator separators 128 and 130 relatively long, and the dynamically isolated conduit gap thickness between the outer housing 28 and the inner rigid member 32 relatively thin. Preferably the length of conduits 150 is relatively long. Preferably the gap thickness of conduits 150 is relatively thin.

In an embodiment the invention includes a hydraulic control system. The hydraulic control system includes at least one hydraulic member with an outer rigid housing 28 and an inner rigid member 32 extending into the outer rigid housing, and at least a first outer bonded tubular elastomer 40', 40" bonded between the inner rigid member 32 and the outer rigid housing 28. The outer rigid housing 28 and the inner rigid member 32 provide a first variable volume fluid internal chamber 62 and a second variable volume fluid internal chamber 64 with an inner rigid member hydraulic fluid moved piston 125 between the first variable volume fluid internal chamber 62 and the second variable volume fluid internal chamber 64. The hydraulic control system includes first chamber hydraulic fluid delivery conduit 121 for delivering hydraulic fluid to the first variable volume fluid internal chamber 62 and second chamber hydraulic fluid delivery conduit 123 for delivering hydraulic fluid to the second variable volume fluid internal chamber 64. Preferably the hydraulic member includes second outer bonded tubular elastomer 40", with the second outer bonded tubular elastomer 40" bonded between the inner rigid member and the outer rigid housing. Preferably the first outer bonded elastomer 40' and the second outer bonded elastomer 40" are distal from the first variable volume fluid internal chamber 62 and the second variable volume fluid internal chamber 64. The outer rigid housing, the inner rigid member, the first outer bonded elastomer and the second outer bonded elastomer define an external fluid-elastomeric chamber 127 operable for containing the hydraulic fluid 60, with the first variable volume fluid internal chamber 62, the second variable volume fluid internal chamber 64, and the inner rigid member hydraulic fluid moved piston 125 internal to and submerged within the external fluid-elastomeric chamber 127. The first variable volume fluid chamber 62 and the second variable volume fluid chamber 64 are in fluid communication with the surrounding external fluid-elastomeric chamber 127 with the first variable volume fluid chamber and the second variable volume fluid chamber separated from the surrounding external fluid-elastomeric chamber, with the fluid in the external fluid-elastomeric chamber outside the first variable volume fluid chamber and the second variable volume fluid chamber having an operational outside ambient fluid pressure OFP dynamically isolated from the first variable volume fluid chamber and the second variable volume fluid chamber. Preferably the first variable volume fluid chamber 62 and the second variable volume fluid chamber 64 are separated from the surrounding external fluid-elastomeric chamber, with the fluid in the external fluid-elastomeric chamber 127 outside the first variable volume fluid chamber and the second variable volume fluid chamber dynamically isolated from the internal chambers 62 and 64 and preferably having the dynamically isolated operational outside ambient fluid pressure OFP. Preferably the external fluid-elastomeric chamber 127 has the first chamber end 129 adjacent the first outer bonded tubular elastomer 40' and the second chamber end 131 adjacent the second outer bonded tubular elastomer 40", with the operational outside ambient OFP pressure fluid transfer conduit 133 connecting the first chamber end 129 and the second chamber end 131. The support strut creates dynamic forces and controls motion with controlled modulating of the pressures in the first variable volume fluid chamber 62 and the second variable volume fluid chamber 64 about the nominal pressure (IFP1=Pnom+dP1, IFP2=Pnom+dP2). The controlled dynamic force is created with the pressure differential applied to the piston 125. The fluid communication conduits between the internal chambers 62 and 64 and the external fluid-elastomeric chamber 127 are preferably dynamically isolating relatively long and thin conduits with the relatively small cross-section area and relatively long lengths such that the external fluid-elastomeric chamber 127 is substantially dynamically isolated from the dynamic pressures (OFP~Pnom) supplied from the hydraulic pressure source P and the low pressure hydraulic reservoir R through the pressure differential delivery conduits 121, 123. Preferably the system/method includes maintaining the fluid in the fluid-elastomeric chamber ends 129 and 131 adjacent to the elastomer sections 40' and 40" near and proximate the nominal pressure (Pnom) and isolating the fluid there from the modulated dynamic pressure fluctuations in internal chambers 62 and 64, preferably with dynamically isolating conduits 150 inhibiting OFP pressure from changing with the modulated pressure differentials dP1 and dP2. Preferably the dynamic isolator separators 128 and 130 protrude from the outer housing 28 inward towards the inner rigid member 32 and define dynamically isolated conduits 150. Preferably the dynamic isolator separators 128 and 130 define dynamically isolated conduits 150 with fluid communication dimensions which isolate the chamber ends 129 and 131 from the modulated dynamic pressure fluctuations in internal chambers 62 and 64. Preferably the dimensions of isolator separators 128 and 130 and the isolated conduits 150 are sized to provide substantial dynamic isolation. Preferably the isolated conduits 150 are relatively small and provide a constricted fluid communication with constricted fluid flow, preferably with the axial longitudinally extending length of dynamic isolator separators 128 and 130 relatively long, and the dynamically isolated conduit gap thickness between the outer housing 28 and the inner rigid member 32 relatively thin. Preferably the length of conduits 150 is relatively long. Preferably the gap thickness of conduits 150 is relatively thin.

In an embodiment the invention includes a method of controlling a hydraulic system. The method includes providing a hydraulic power supply 143, the hydraulic power supply 143 providing a source of pressurized hydraulic fluid 60. The method includes providing at least one hydraulic member, the hydraulic member having an outer rigid housing 28 and an inner rigid member 32 extending into the outer rigid housing 28, and at least a first outer bonded tubular elastomer 40', 40" bonded between the inner rigid member 32 and the outer rigid housing 28, the outer rigid housing and the inner rigid member providing first variable volume fluid internal chamber 62 and second variable volume fluid internal chamber 64 with inner rigid member hydraulic fluid moved piston 125 between the first variable volume fluid internal chamber 62 and the second variable volume fluid internal chamber 64. The hydraulic member includes first chamber hydraulic fluid delivery conduit 121 for delivering hydraulic fluid to the first variable volume fluid internal chamber 62 and second chamber hydraulic fluid delivery conduit 123 for delivering hydraulic fluid to the second variable volume fluid internal chamber 64. The method includes connecting the hydraulic power supply 143 to the first chamber hydraulic fluid delivery conduit 121 and the second chamber hydraulic fluid delivery conduit 123, and supplying hydraulic fluid to the first variable volume fluid internal chamber 62 and the second variable volume fluid internal chamber 64. Preferably the hydraulic member includes the second outer bonded tubular elastomer 40", with the second outer bonded tubular elastomer 40" bonded between the outer rigid housing 28 and the inner rigid member 32. Preferably the first outer bonded tubular elastomer 40' and the second outer bonded tubular elastomer 40" are distal from the first variable volume fluid internal chamber 62 and the second variable volume fluid internal chamber 64. Preferably the outer rigid housing, the inner rigid member, the first outer bonded tubular elastomer and the second outer bonded tubular elastomer define external fluid-elastomeric chamber 127 operable for containing the hydraulic fluid 60, with the first variable volume fluid internal chamber 62, the second variable volume fluid internal chamber 64, and the inner rigid member hydraulic fluid moved piston 125 internal to and submerged within the external fluid-elastomeric chamber 127. Preferably the first variable volume fluid internal chamber and the second variable volume fluid internal chamber are in fluid communication with the surrounding external fluid-elastomeric chamber with the first variable volume fluid internal chamber and the second variable volume fluid internal chamber separated from the surrounding external fluid-elastomeric chamber, with the fluid in the external fluid-elastomeric chamber outside the first variable volume fluid chamber and the second variable volume fluid chamber having the dynamically isolated operational outside ambient fluid pressure OFP. Preferably the first variable volume fluid chamber 62 and the second variable volume fluid chamber 64 are separated from the surrounding external fluid-elastomeric chamber, with the fluid in the external fluid-elastomeric chamber 127 outside the first variable volume fluid chamber and the second variable volume fluid chamber dynamically isolated from the internal chambers 62 and 64 and preferably having the dynamically isolated operational outside ambient fluid pressure OFP. Preferably the external fluid-elastomeric chamber 127 has the first chamber end 129 adjacent the first outer bonded tubular elastomer 40' and the second chamber end 131 adjacent the second outer bonded tubular elastomer 40", with the operational outside ambient OFP pressure fluid transfer conduit 133 connecting the first chamber end 129 and the second chamber end 131. The support strut creates dynamic forces and controls motion with controlled modulating of the pressures in the first variable volume fluid chamber 62 and the second variable volume fluid chamber 64 about the nominal pressure (IFP1=Pnom+dP1, IFP2=Pnom+dP2). The controlled dynamic force is created with the pressure differential applied to the piston 125. The fluid communication conduits between the internal chambers 62 and 64 and the external fluid-elastomeric chamber 127 are preferably dynamically isolating relatively long and thin conduits with the relatively small cross-section area and relatively long lengths such that the external fluid-elastomeric chamber 127 is substantially dynamically isolated from the dynamic pressures (OFP~Pnom) supplied from the hydraulic pressure source P and the low pressure hydraulic reservoir R through the pressure differential delivery conduits 121, 123. Preferably the system/method includes maintaining the fluid in the fluid-elastomeric chamber ends 129 and 131 adjacent to the elastomer sections 40' and 40" near and proximate the nominal pressure (Pnom) and isolating the fluid there from the modulated dynamic pressure fluctuations in internal chambers 62 and 64, preferably with dynamically isolating conduits 150 inhibiting OFP pressure from changing with the modulated pressure differentials dP1 and dP2. Preferably the dynamic isolator separators 128 and 130 protrude from the outer housing 28 inward towards the inner rigid member 32 and define dynamically isolated conduits 150. Preferably the dynamic isolator separators 128 and 130 define dynamically isolated conduits 150 with fluid communication dimensions which isolate the chamber ends 129 and 131 from the modulated dynamic pressure fluctuations between chambers 62 and 64. Preferably the dimensions of isolator separators 128 and 130 and the isolated conduits 150 are sized for substantial dynamic isolation. Preferably the isolated conduits 150 are relatively small and provide a constricted fluid communication with constricted fluid flow, preferably with the axial longitudinally extending length of dynamic isolator separators 128 and 130 relatively long, and the dynamically isolated conduit gap thickness between the outer housing 28 and the inner rigid member 32 relatively thin. Preferably the length of conduits 150 is relatively long. Preferably the gap thickness of conduits 150 is relatively thin.

In an embodiment the invention includes a device for controlling motion. The device includes a fluid containing member with a fluid 60 and an outer rigid tubular housing 28 and an inner rigid member 32 extending into the outer rigid housing 28, and at least a first outer bonded tubular elastomer 40, 40', 40" bonded between the inner rigid member 32 and the outer rigid housing 28, the outer rigid housing 28 and the inner rigid member 32 providing a first variable volume fluid internal chamber 62 and a second variable volume fluid internal chamber 64. The inner rigid member 32 includes a nonelastomer intermediate between the first variable volume fluid internal chamber 62 and the second variable volume fluid internal chamber 64 and a powered means for creating a fluid pressure differential between the first variable volume fluid internal chamber 62 and the second variable volume fluid internal chamber 64. In preferred embodiments the first and second outer bonded tubular elastomers 40' and 40" are bonded between the inner rigid member 32 and the outer rigid housing 28 with the inner rigid member nonelastomer intermediate between the tubular elastomers 40' and 40", preferably with the first outer bonded elastomer 40' and the second outer bonded elastomer 40" distal from the first variable volume fluid internal chamber 62 and the second variable volume fluid internal chamber 64. Preferably the outer rigid housing 28, the inner rigid member 32, the first outer bonded elastomer 40' and the second outer bonded elastomer 40" define an external fluid-elastomeric chamber 127 operable for containing the fluid 60, with the first variable volume fluid internal chamber 62 and the second variable volume fluid internal chamber 64 internal to and submerged within the external fluid-elastomeric chamber 127. Preferably the first variable volume fluid chamber 62 and the second variable volume fluid chamber 64 are in fluid communication with the surrounding external fluid-elastomeric chamber 127 with the first variable volume fluid chamber and the second variable volume fluid chamber separated from the surrounding external fluid-elastomeric chamber, with the fluid in the external fluid-elastomeric chamber outside the first variable volume fluid chamber and the second variable volume fluid chamber having a dynamically isolated operational outside ambient fluid pressure OFP. In an embodiment the powered means for creating the fluid pressure differential between the first variable volume fluid internal chamber 62 and the second variable volume fluid internal chamber 64 is an electrical powered means for forcing the fluid between the first variable volume fluid internal chamber and the second variable volume fluid internal chamber. Preferably the electrical powered means for forcing the fluid between the first variable volume fluid internal chamber and the second variable volume fluid internal chamber is an electromagnetic actuator 115, most preferably a rotary motor for outputting clockwise and counter clockwise rotation motions. Preferably the rotary motor device includes a means for converting the rotation motions into a reciprocating linear motion of a plunger 54. In an embodiment the powered means for creating the fluid pressure differential between the first variable volume fluid internal chamber 62 and the second variable volume fluid internal chamber 64 is a hydraulic powered means for creating the fluid pressure differential between the first variable volume fluid internal chamber and the second variable volume fluid internal chamber. In an embodiment the hydraulic powered means is a hydraulic actuator 113, most preferably a servohydraulic actuator. In an embodiment the hydraulic powered means for creating the fluid pressure differential between the first variable volume fluid internal chamber 62 and the second variable volume fluid internal chamber 64 includes a hydraulic power input source 143 controllably delivering and removing hydraulic fluid through fluid delivery conduits 121, 123 to the first variable volume fluid internal chamber 62 and the second variable volume fluid internal chamber 64. Preferably the first variable volume fluid chamber 62 and the second variable volume fluid chamber 64 are separated from the surrounding external fluid-elastomeric chamber, with the fluid in the external fluid-elastomeric chamber 127 outside the first variable volume fluid chamber and the second variable volume fluid chamber dynamically isolated from the internal chambers 62 and 64 and preferably having the dynamically isolated operational outside ambient fluid pressure OFP. Preferably the external fluid-elastomeric chamber 127 has the first chamber end 129 adjacent the first outer bonded tubular elastomer 40' and the second chamber end 131 adjacent the second outer bonded tubular elastomer 40", with the operational outside ambient OFP pressure fluid transfer conduit 133 connecting the first chamber end 129 and the second chamber end 131. The support strut creates dynamic forces and controls motion with controlled modulating of the pressures in the first variable volume fluid chamber 62 and the second variable volume fluid chamber 64 about the nominal pressure (IFP1=Pnom+dP1, IFP2=Pnom+dP2). The controlled dynamic force is created with the pressure differential applied to the piston 125. The fluid communication conduits between the internal chambers 62 and 64 and the external fluid-elastomeric chamber 127 are preferably dynamically isolating relatively long and thin conduits with the relatively small cross-section area and relatively long lengths such that the external fluid-elastomeric chamber 127 is substantially dynamically isolated from the modulated dynamic pressures (OFP~Pnom) supplied from the hydraulic pressure source P and the low pressure hydraulic reservoir R through the pressure differential delivery conduits 121, 123.

Preferably the system/method includes maintaining the fluid in the fluid-elastomeric chamber ends 129 and 131 adjacent to the elastomer sections 40' and 40" near and proximate the nominal pressure (Pnom) and isolating the fluid there from the modulated dynamic pressure fluctuations in internal chambers 62 and 64, preferably with dynamically isolating conduits 150 inhibiting OFP pressure from changing with the rapidly modulated pressure differentials dP1 and dP2. Preferably the dynamic isolator separators 128 and 130 protrude from the outer housing 28 inward towards the inner rigid member 32 and define dynamically isolated conduits 150. Preferably the dynamic isolator separators 128 and 130 define dynamically isolated conduits 150 with fluid communication dimensions which isolate the chamber ends 129 and 131 from the modulated dynamic pressure fluctuations. Preferably the dimensions of isolator separators 128 and 130 and the isolated conduits 150 are sized to dynamically isolate the chamber 127 from the high frequency modulated dynamic pressure fluctuations. Preferably the isolated conduits 150 are relatively small and provide a constricted fluid communication with constricted fluid flow, preferably with the axial longitudinally extending length of the dynamic isolator separators 128 and 130 relatively long, and the dynamically isolated conduit gap thickness between the outer housing 28 and the inner rigid member 32 relatively thin. Preferably the length of conduits 150 is relatively long. Preferably the gap thickness of conduits 150 is relatively thin.

In an embodiment the invention includes a method of controlling motion. The method includes providing a fluid containing member with the fluid 60 and the outer rigid tubular housing 28 and the inner rigid member 32 extending into the outer rigid housing 28, and at least a first outer bonded tubular elastomer 40, 40', 40" bonded between the inner rigid member 32 and the outer rigid housing 28. The outer rigid housing 28 and the inner rigid member 32 provide the first variable volume fluid internal chamber 62 and the second variable volume fluid internal chamber 64 with inner rigid member 32 having a nonelastomer intermediate between the first variable volume fluid internal chamber 62 and the second variable volume fluid internal chamber 64. The method includes creating a pressure differential between the first variable volume fluid internal chamber 62 and the second variable volume fluid internal chamber 64. In preferred embodiments creating the fluid pressure differential between the first variable volume fluid internal chamber and the second variable volume fluid internal chamber includes providing electrical power for forcing the fluid between the first variable volume fluid internal chamber and the second variable volume fluid internal chamber, preferably with the electrical power provided to an electromagnetic actuator 115, preferably a rotary motor. In preferred embodiments creating the fluid pressure differential between the first variable volume fluid internal chamber and the second variable volume fluid internal chamber includes providing controlled hydraulic power. In preferred embodiments the fluid containing member includes second outer bonded tubular elastomer 40", with the first and second outer bonded tubular elastomer 40', 40" bonded between the outer rigid housing and the inner rigid member, preferably with the first outer bonded tubular elastomer 40' and the second outer bonded tubular elastomer 40" distal from the first variable volume fluid internal chamber 62 and the second variable volume fluid internal chamber 64. Preferably the outer rigid housing, the inner rigid member, the first outer bonded tubular elastomer and the second outer bonded tubular elastomer define external fluid-elastomeric chamber 127 operable for containing the hydraulic fluid, with the first variable volume fluid internal chamber, the second variable volume fluid internal chamber, and the inner rigid member hydraulic fluid moved piston internal to and submerged within the external fluid-elastomeric chamber. Preferably the first variable volume fluid internal chamber and the second variable volume fluid internal chamber are in fluid communication with the surrounding external fluid-elastomeric chamber with the first variable volume fluid internal chamber and the second variable volume fluid internal chamber separated from the surrounding external fluid-elastomeric chamber, with the fluid in the external fluid-elastomeric chamber outside the first variable volume fluid chamber and the second variable volume fluid chamber having the operational outside ambient fluid pressure OFP. Preferably the first variable volume fluid chamber 62 and the second variable volume fluid chamber 64 are separated from the surrounding external fluid-elastomeric chamber, with the fluid in the external fluid-elastomeric chamber 127 outside the first variable volume fluid chamber and the second variable volume fluid chamber dynamically isolated from the internal chambers 62 and 64 and preferably having the dynamically isolated operational outside ambient fluid pressure OFP. Preferably the external fluid-elastomeric chamber 127 has the first chamber end 129 adjacent the first outer bonded tubular elastomer 40' and the second chamber end 131 adjacent the second outer bonded tubular elastomer 40", with the operational outside ambient OFP pressure fluid transfer conduit 133 connecting the first chamber end 129 and the second chamber end 131. The support strut creates dynamic forces and controls motion with controlled modulating of the pressures in the first variable volume fluid chamber 62 and the second variable volume fluid chamber 64 about the nominal pressure (IFP1=Pnom+dP1, IFP2=Pnom+dP2). The controlled dynamic force is created with the pressure differential applied to the piston 125. The fluid communication conduits between the internal chambers 62 and 64 and the external fluid-elastomeric chamber 127 are preferably dynamically isolating relatively long and thin conduits with the relatively small cross-section area and relatively long lengths such that the external fluid-elastomeric chamber 127 is substantially dynamically isolated from the dynamic pressures (OFP~Pnom) supplied from the hydraulic pressure source P and the low pressure hydraulic reservoir R through the pressure differential delivery conduits 121, 123. Preferably the system/method includes maintaining the fluid in the fluid-elastomeric chamber ends 129 and 131 adjacent to the elastomer sections 40' and 40" near and proximate the nominal pressure (Pnom) and isolating the fluid there from the modulated dynamic pressure fluctuations in internal chambers 62 and 64, preferably with dynamically isolating conduits 150 inhibiting OFP pressure from changing with the modulated pressure differentials dP1 and dP2. Preferably the dynamic isolator separators 128 and 130 protrude from the outer housing 28 inward towards the inner rigid member 32 and define dynamically isolated conduits 150. Preferably the dynamic isolator separators 128 and 130 define dynamically isolated conduits 150 with fluid communication dimensions which isolate the chamber ends 129 and 131 from the modulated dynamic pressure fluctuations. Preferably the dimensions of isolator separators 128 and 130 and the isolated conduits 150 are sized relative to the pressure differentials and their modulated frequency. Preferably the isolated conduits 150 are relatively small and provide a constricted fluid communication with constricted fluid flow, preferably with the axial longitudinally extending length of dynamic isolator separators 128 and 130 relatively long, and the dynamically isolated conduit gap thickness between the outer housing 28 and the inner rigid member 32 relatively thin. Preferably the length of conduits 150 is relatively long. Preferably the gap thickness of conduits 150 is relatively thin.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A support strut for supporting an axial load, said support strut including a strut isolator, said strut isolator having a first strut end member at a first strut end and a second strut end member at a second strut end, said second strut end distal from said first strut end, said first strut end member including an outer rigid housing, said outer rigid housing defining an inner cavity, said second strut end member including an inner rigid member, said inner rigid member extending into said outer rigid housing inner cavity, said inner rigid member including an inertial track extending in a direction from said first strut end towards said second strut end, said inertial track having a first entrance end proximate said first strut end and a second entrance end proximate said second strut end, said inner rigid member including an internal housing cavity, a first outer tubular elastomer disposed between said outer rigid housing and said inner rigid member, said first outer tubular elastomer bonded to a first inner rigid surface of said outer rigid housing, said first outer tubular elastomer bonded to a first outer rigid surface of said inner rigid member, an isolator fluid, said outer rigid housing, and said inner rigid member providing a first variable volume fluid chamber proximate said first strut end and said first track entrance end, said inner rigid member internal housing cavity housing a second variable volume fluid chamber proximate said second strut end and said second track entrance end, an actuator plunger, said actuator plunger disposed in said inner cavity proximate said second variable volume fluid chamber, wherein a movement of said first strut end member in a first strut direction towards said second strut end member plunging said fluid from said first variable volume chamber through said track towards said second variable volume chamber, and an opposite movement of said first strut end member in a second direction away from said second strut end plunging said fluid from said second variable volume chamber through said track towards said first variable volume chamber, and an active powered actuator plunger contracting stroke in a first active powered actuator direction contracts said second variable volume chamber, and an active powered actuator plunger expanding stroke in an opposite second active powered actuator direction expands said second variable volume chamber.

2. A support strut as claimed in claim 1, wherein said isolator strut includes a variable volume compensator chamber proximate said first variable volume chamber.

3. A support strut as claimed in claim 1, wherein said isolator strut includes a variable volume fluid compensator, said variable volume compensator comprised of a first mechanical spring and a second gas spring.

4. A support strut as claimed in claim 1, wherein said isolator strut includes a second end inner tubular elastomer, said second end inner tubular elastomer disposed between said actuator plunger and an inner rigid member internal housing cavity inner wall.

5. A support strut as claimed in claim 1, wherein said actuator plunger is a hydraulic powered actuator plunger.

6. A support strut as claimed in claim 1, wherein said actuator plunger is an electric powered actuator plunger.

7. A support isolator, said isolator having a first strut end member at a first strut end and a second strut end member at a second strut end, said second strut end distal from said first strut end, said first strut end member including an outer rigid housing, said outer rigid housing defining an inner cavity, said second strut end member including an inner rigid member, said inner rigid member extending into said outer rigid housing inner cavity, said inner rigid member including an inertial track extending in a direction from said first strut end towards said second strut end, said inertial track having a first entrance end proximate said first strut end and a second entrance end proximate said second strut end, said inner rigid member including an internal housing cavity, a first outer tubular elastomer disposed between said outer rigid housing and said inner rigid member, said first outer tubular elastomer bonded to a first inner rigid surface of said outer rigid housing, said first outer tubular elastomer bonded to a first outer rigid surface of said inner rigid member, said first outer tubular elastomer having an inside diameter ID1, an isolator fluid, said outer rigid housing, and said inner rigid member providing a first variable volume fluid chamber proximate said first strut end and said first track entrance end, said inner rigid member internal housing cavity housing a second variable volume fluid chamber proximate said second strut end and said second track entrance end, said second variable volume fluid chamber including an actuator plunger and a bonded second inner tubular elastomer, said bonded second inner tubular elastomer having an inside diameter ID2, said bonded second inner tubular elastomer bonded to an outer plunger surface and an inner rigid member internal housing cavity inside bonding wall, said bonded second inner tubular elastomer inside diameter ID2<ID1, wherein a movement of said first strut end member in a first strut direction towards said second strut end member plunging said fluid from said first variable volume chamber through said track towards said second variable volume chamber, and an opposite movement of said first strut end member in a second direction away from said second strut end plunging said fluid from said second variable volume chamber through said track towards said first variable volume chamber, and an active powered actuator plunger contracting stroke in a first actuator direction contracts said second variable volume chamber, and an active powered actuator plunger expanding stroke in an opposite second actuator direction expands said second variable volume chamber.

8. An isolator as claimed in claim 7, wherein said isolator includes a variable volume compensator chamber.

9. An isolator as claimed in claim 8, wherein said variable volume compensator chamber includes an at least two spring loaded compensator piston.

10. An isolator as claimed in claim 7, wherein said actuator plunger is a hydraulic powered actuator plunger.

11. An isolator as claimed in claim 7, wherein said actuator plunger is an electric powered actuator plunger.

12. A longitudinal isolator, said longitudinal isolator having an exterior and a longitudinally extending axis, said isolator having a first end member at a first end and a second end member at a second end, said second end opposite from said first end along said longitudinally extending axis, said first end member including an outer rigid housing, said outer rigid housing defining an inner cavity, said second end member including an inner rigid member, said inner rigid member extending into said outer rigid housing inner cavity, said inner rigid member including an inertial track extending in a direction from said first strut end towards said second strut end, said inertial track having a first entrance end proximate said first strut end and a second entrance end proximate said second strut end, said inner rigid member including an internal housing cavity, a first outer tubular elastomer disposed between said outer rigid housing and said inner rigid member, said first outer tubular elastomer bonded to a first inner rigid surface of said outer rigid housing, said first outer tubular elastomer bonded to a first outer rigid surface of said inner rigid member, said first outer tubular elastomer having an inside diameter ID1 and an outside diameter OD1, an isolator fluid, said outer rigid housing, and said inner rigid member providing a first variable volume fluid chamber proximate said first strut end and said first track entrance end, said inner rigid member internal housing cavity housing a second variable volume fluid chamber proximate said second strut end and said second track entrance end, said second variable volume fluid chamber including a powered actuator plunger and a bonded second inner tubular elastomer, said bonded second inner tubular elastomer having an inside diameter ID2 and an outside diameter OD2, said bonded second inner tubular elastomer inside diameter ID2 bonded to an outer plunger surface of said powered actuator plunger and said bonded second inner tubular elastomer outside diameter OD2 bonded to an inner rigid member internal housing cavity inside bonding wall, said bonded second inner tubular elastomer inside diameter ID2<ID1, wherein an active powered actuator plunger contracting stroke in a first actuator direction contracts said second variable volume chamber, and an active powered actuator plunger expanding stroke in an opposite second actuator direction expands said second variable volume chamber, and a movement of said first strut end member in a first strut direction towards said second strut end member plunging said fluid from said first variable volume chamber through said track towards said second variable volume chamber, and an opposite movement of said first strut end member in a second direction away from said second strut end plunging said fluid from said second variable volume chamber through said track towards said first variable volume chamber.

13. An isolator as claimed in claim 12, wherein said isolator includes a variable volume compensator chamber.

14. An isolator as claimed in claim 13, wherein said variable volume compensator chamber includes a double spring loaded compensator piston.

15. An isolator as claimed in claim 12, wherein said powered actuator plunger is a hydraulic powered actuator plunger.

16. An isolator as claimed in claim 12, wherein said powered actuator plunger is an electric powered actuator plunger.

17. A support strut isolator, said support strut isolator having an exterior and a longitudinally extending axis, said support strut isolator having a first end and a second end, said second end opposite from said first end along said longitudinally extending axis, said first end including an outer rigid longitudinally extending housing, said outer rigid longitudinally extending housing extending longitudinally towards said second end, said outer rigid longitudinally extending housing defining an inner cavity, said inner cavity containing a first variable volume chamber and a second variable volume chamber with an isolator fluid, said second strut end including a rigid structural extension longitudinally extending from the isolator exterior into the inner cavity, said rigid structural extension including an inner rigid member, said inner rigid member including an inertial fluid track extending in a direction from said first end towards said second end, said inertial fluid track having a first entrance end in fluid communication with said first variable volume chamber and a second entrance end in fluid communication with said second variable volume chamber, with a spring between said inner rigid member and said outer rigid housing providing a high static spring stiffness of at least 3,000 lbs/inch, said isolator including an active powered actuator plunger, wherein a vibration movement of said first strut end member in a first strut direction towards said second strut end member plunging said fluid from said first variable volume chamber through said track towards said second variable volume chamber, and an opposite vibration movement of said first strut end member in a second direction away from said second strut end plunging said fluid from said second variable volume chamber through said track towards said first variable volume chamber, and an applied actuator power applied to said active powered actuator plunger provides an actuator plunger contracting stroke in a first actuator direction which contracts said second variable volume chamber and an actuator plunger expanding stroke in an opposite second actuator direction which expands said second variable volume chamber.

18. A support strut isolator as claimed in claim 17, wherein said actuator plunger is a hydraulic powered actuator plunger and said applied actuator power is a hydraulic power.

19. A support strut isolator as claimed in claim 17, wherein said actuator plunger is an electric powered actuator plunger and said applied actuator power is an electric power.

20. A method of controlling motion, said method including:
providing a fluid containing member with a fluid and an outer rigid tubular housing and an inner rigid member extending into said outer rigid housing, at least a first outer bonded tubular elastomer bonded between said inner rigid member and said outer rigid housing, and a second outer bonded tubular elastomer, said second outer bonded tubular elastomer bonded between said outer rigid housing and said inner rigid member, said outer rigid housing and said inner rigid member providing a first variable volume fluid internal chamber and a second variable volume fluid internal chamber with an inner rigid member intermediate between said first variable volume fluid internal chamber and said second variable volume fluid internal chamber, said first outer bonded tubular elastomer and said second outer bonded tubular elastomer are distal from said first variable volume fluid internal chamber and said second variable volume fluid internal chamber,
and creating a fluid pressure differential between said first variable volume fluid internal chamber and said second variable volume fluid internal chamber.

21. A method as claimed in claim 20, wherein said outer rigid housing, said inner rigid member, said first outer bonded tubular elastomer and said second outer bonded tubular elastomer define an external fluid-elastomeric chamber.

22. A method as claimed in claim 21 wherein said first variable volume fluid internal chamber and said second variable volume fluid internal chamber are in fluid communication with the external fluid-elastomeric chamber with said first variable volume fluid internal chamber and said second variable volume fluid internal chamber separated from the external fluid-elastomeric chamber, with the fluid in said external fluid-elastomeric chamber outside said first variable volume fluid chamber and said second variable volume fluid chamber having an operational isolated fluid pressure isolated from said created fluid pressure differential.

23. A method as claimed in claim 21 wherein said external fluid-elastomeric chamber has a first chamber end adjacent said first outer bonded tubular elastomer and a second chamber end adjacent said second outer bonded tubular elastomer, with an operational outside fluid transfer conduit connecting said first chamber end and said second chamber end.

24. A method as claimed in claim 20, wherein creating said fluid pressure differential between said first variable volume fluid internal chamber and said second variable volume fluid internal chamber includes providing electrical power to an actuator.

25. A method as claimed in claim 20, wherein creating said fluid pressure differential between said first variable volume fluid internal chamber and said second variable volume fluid internal chamber includes providing hydraulic power to a servovalve.

* * * * *